United States Patent
Rosenburg et al.

(10) Patent No.: US 9,208,460 B2
(45) Date of Patent: Dec. 8, 2015

(54) SYSTEM AND METHODS TO FACILITATE ANALYTICS WITH A TAGGED CORPUS

(71) Applicant: LexisNexis, a division of Reed Elsevier Inc., Miamisburg, OH (US)

(72) Inventors: Dihan Marie Rosenburg, Bellbrook, OH (US); Scott Edward Meiser, Butler, PA (US); Susan Marie Slisz, Beavercreek, OH (US); Daren William Keenan, Liberty Township, OH (US); Raymond A. Daley, Springboro, OH (US); Michael Ronald Sluterbeck, Dayton, OH (US); Saravanan Chidambaram, Miamisburg, OH (US); Mina Tonsaly, Hamilton, OH (US); David L. Schmeer, Dayton, OH (US); John Scott Attenborough, St. Thomas, VI (US); Sanjay Sharma, Mason, OH (US); James Antony Ritchie, Surrey (GB)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 330 days.

(21) Appl. No.: 13/655,841

(22) Filed: Oct. 19, 2012

(65) Prior Publication Data

US 2014/0114962 A1    Apr. 24, 2014

(51) Int. Cl.
*G06F 17/30* (2006.01)
*G06Q 10/06* (2012.01)

(52) U.S. Cl.
CPC .................................. *G06Q 10/063* (2013.01)

(58) Field of Classification Search
None
See application file for complete search history.

(56) References Cited

U.S. PATENT DOCUMENTS

| | | | |
|---|---|---|---|
| 6,681,223 B1 | 1/2004 | Sundaresan | |
| 7,698,348 B2 | 4/2010 | Walker et al. | |
| 8,126,762 B2 | 2/2012 | Ramachandran et al. | |
| 8,140,454 B2 | 3/2012 | Bullen et al. | |
| 8,244,708 B2 | 8/2012 | Nagle | |
| 8,442,994 B1 * | 5/2013 | Chen et al. | 707/781 |
| 2004/0034612 A1 | 2/2004 | Mathewson et al. | |
| 2006/0230028 A1 * | 10/2006 | Kellet et al. | 707/3 |
| 2007/0083564 A1 * | 4/2007 | Ramacher et al. | 707/200 |
| 2009/0089107 A1 | 4/2009 | Angell et al. | |
| 2011/0202386 A1 | 8/2011 | Hamlisch et al. | |
| 2012/0203708 A1 * | 8/2012 | Psota et al. | 705/347 |
| 2012/0209890 A1 * | 8/2012 | Nowacki et al. | 707/805 |

FOREIGN PATENT DOCUMENTS

WO    2007052285    5/2007

OTHER PUBLICATIONS

Media Cloud, retrieved Jan. 22, 2013, http://www.mediacloud.org/dashboard/media_sets/1.

(Continued)

*Primary Examiner* — Kevin L Young
*Assistant Examiner* — Tyler Torgrimson
(74) *Attorney, Agent, or Firm* — Dinsmore & Shohl LLP

(57) ABSTRACT

The disclosed embodiments provide a set of methods, systems, data structures, and computer-executable instructions for executing on a compute machine to automatically analyze data associated with an indexed corpora and to generate for graphical display a set of results associated with those analytic operations.

14 Claims, 30 Drawing Sheets

(56) References Cited

OTHER PUBLICATIONS

Rowse, Darren, Topix Adds News Trend Tracker, Aug. 7, 2006, retrieved Jan. 22, 2013, http://www.problogger.net/archives/2006/08/07/topix-adds-news-trend-tracker/.
Google, retrieved Jan. 22, 2013, http://www.google.com/trends/explore#q=human+trafficking.
Glockner, Phil, media Cloud Leverages Calais to Track News Trends, Mar. 11, 2009, retrieved Jan. 22, 2013, http://readwrite.com/2009/03/11/media_cloud_leverages_calais_to_track_news_trends.
PCT Patent Application No. PCT/US2013/065176, filed Oct. 16, 2013, International Search Report and Written Opinion mailed on Feb. 17, 2014.
Thomas Goetz, How to Spot the Future, Wired Business, Apr. 24, 2012, Retrieved on Oct. 16, 2012, http://www.wired.com/business/2012/04/ff_spotfuture/.
What is Business Activity Monitoring Software, WTG News, Sep. 22, 2011, Oct. 16, 2012, http://www.wtgnews.com/2011/09/business-activity-monitoring-for-the-next-generation-enterprise/.
Appian BPM Suite: Predictive Analytics, Appian, Retrieved on Oct. 16, 2012, http://www.appian.com/bpm-software/bpm-components/bpm-predictive-analytics.jsp.
IBM Business Monitor, IBM, Retrieved on Oct. 16, 2012, http://www-01.ibm.com/software/integration/business-monitor/features/?S_CMP=wspace.
Optimizing BPM and System Resources with BAM, SoftwareAG, Retrieved on Jul. 27, 2012, http://documentation.softwareag.com/webmethods/wmsuites/wmsuite8_ga/Optimize_and_Monitor/8-0-SP1_Optimize_Users_Guide.pdf.
Brunel University Research Archive, Brunel University London, Retrieved on Oct. 16, 2012, http://bura.brunel.ac.uk/handle/2438/633.
PeopleSoft, Wikipedia, Retrieved on Oct. 16, 2012, http://en.wikipedia.org/wiki/PeopleSoft.
Baan Corporation, Wikipedia, Retrieved on Oct. 16, 2012, http://en.wikipedia.org/wiki/Baan_Corporation.
i2 Technologies, Wikipedia, Retrieved on Oct. 16, 2012, http://en.wikipedia.org/wiki/I2_Technologies.
JD Edwards EnterpriseOne, Oracle, Retrieved on Oct. 16, 2012, http://www.oracle.com/us/products/applications/jd-enterpriseone/overview/index.html.
Promis Project Management, Retrieved on Oct. 16, 2012, http://www.promis-group.com/.
QAD, Retrieved on Oct. 16, 2012, http://www.qad.com/erp/.
New Models for Addressing Supply Chain and Transport Risk, World Economic Forum, Retrieved on Oct. 16, 2012, http://reports.weforum.org/new-models-for-addressing-supply-chain-and-transport-risk-2012/.
Y. Chang, et al., Supply Chain Modeling Using Simulation, I.J. of Simulation vol. 2 No. 1, pp. 24-30, Retrieved on Oct. 16, 2012, http://ducati.doc.ntu.ac.uk/uksim/journal/Vol-2/No-1/Yoon%20Chang/Chang.pdf.
Dow Jones, Retrieved on Oct. 16, 2012, http://www.dowjones.com/.
Dun & Bradstreet Business Information, D&B, Retrieved on Oct. 16, 2012, http://www.dnb.com/.
About SAP: Helping the World Run Better, SAP, Retrieved on Oct. 16, 2012, http://www.sap.com/corporate-en/index.epx.
Appian, Retrieved on Oct. 16, 2012, http://www.appian.com/.
Oracle, Retrieved on Oct. 16, 2012, http://www.oracle.com/index.html.
Factiva, Dow Jones, Retrieved on Oct. 16, 2012, http://www.dowjones.com/factiva/sources.asp.

\* cited by examiner

FIG. 1B

| Suppliers | Environmental | | | Economic accumulated | Societal accumulated | Political accumulated | Technology accumulated | Legal accumulated |
|---|---|---|---|---|---|---|---|---|
| | Com | Ind | Loc | | | | | |
| ⊟ Content Operations | | | | accumulated | accumulated | accumulated | accumulated | accumulated |
| 365 Media Group Plc | ○ | ○ | ○ | | | | | |
| 365 Media, Pvt Ltd. | ○ | | ○ | | | | | |
| Abc Gmbh | ○ | ○ | ○ | | | | | |
| American Color Graphics, Inc. | | ⊙ | | | | | | |
| Chrisian Inc | ○ | ○ | ○ | | | | | |
| Dartmouth Publishing Company Ltd. | ○ | | ○ | | | | | |
| Dartmouth Publishng Inc | | ○ | ○ | | | | | |
| Datagroup | | ○ | ○ | | | | | |
| Datamatics | | ○ | ○ | | | | | |
| Diacritech, Inc | ⊖ | | | | | | | |
| Diorki S.L. | ○ | ○ | ○ | | | | | |
| Egloo | ○ | ○ | ○ | | | | | |
| Graphic World Incorporated | ○ | ⊙ | ○ | | | | | |
| Green Point Technology Services Llc | | ⊘ | | | | | | |
| Innodata Isogen Inc | | ○ | ○ | | | | | |
| Integra Software Services Private Limited | | | | | | | | |

From: 2012-03-09  To: 2012-03-09  Search
Filters
Department: All   Category:   Sub-Category: Hide
☐ (Score > 80) ▨ (Score > 60 and <= 80) ▦ (Score > 30 and <= 60) ☐

| Suppliers | Environmental | | | Econo... |
|---|---|---|---|---|
| | Com | Ind | Loc | Com | In |
| ⊟ Technology | | | | | |
| ⊞ Chemicals | | | | | |
| ⊞ Components | | | | | |
| ⊞ Computers | | | | | |
| ⊞ Fiber | | | | | |
| ⊞ Hardware | | | | | |
| ⊞ Laminates | | | | | |
| ⊞ Metal | | | | | |
| ⊞ Semiconductor | | | | | |
| ⊞ Storage | | | | | |
| ⊟ Telephone | | | | | |
| Avago Technologies Ltd. | | | | ○ | |
| Broadcom Corporation | | | | ○ | |
| Byd Company Ltd. | | | | ○ | |
| Cypress Semiconductor Corporation | | | | ⊙ | |
| Foster Electric Co., Ltd. | | | | | |
| Hon Hai Precision Industry Co., Ltd. | | | | | |
| Inventec Appliances Corporation | | | | | |
| Qualcomm Incorporated | | | | | |
| Sanyo Electric Co., Ltd. | | | | ⊙ | |
| Vishay Intertechnology | | | | | |
| ⊞ Wire | | | | | |

260 — Click open a color-coded cell to review the risks driving score.

270 ○ http://cert-www.website.com/leadingindicators/NewsSummary...

Department: Technology          Risk Type: Economic
Category: Telephone             Risk Perspective: Company
Sub Category: -                 Start Date: 3/9/2012
Supplier: Cypress Semiconductor Corporation   End Date: 6/26/2012

Cypress Semiconductor Corporation: Economic: Company   5 documents(s) found.   276

| S.No | Risk Score | Summary |
|---|---|---|
| 1 | ! | Cypress Semiconductor Turns to Loss in Q1 - Quick Facts |
| 2 | ! | Cypress Posts Loss as Expected - Analyst Blog |
| 3 | 50 | Cypress Proposes to Buy Ramtron Proposal - Analyst Blog |
|  | 50 | Cypress Revises Ramtron Proposal - Analyst Blog |
|  | 50 | Cypress up 13% on Q1 earnings |

274

○ Local Intranet | Protected Mode Off    ⚲ 100%

100

Category: Tsunami
Sub Category: Spm Legacy
Supplier: Tokyo Electric Power Co Inc
Tokyo Electric Power Co Inc:Environmental:Company Risk Perspective: Company
Start Date: 3/16/2011
End Date: 3/19/2011

276 document(s) found.

| S.No | Risk Score | Summary |
|---|---|---|
| 1 | | Health effects of radiation poisoning |
| 2 | | Pro-repository legislators cite disaster |
| 3 | | Radiation leak feared at at quake-hit Fukushima No.1 nuclear plant in Japan, water injection ordered |
| 4 | | Roundup: Helicopters dump water to cool down Japans overheating reactors |
| 5 | | (Update) Japan SDF Choppers Dump Water on Ov |
| 6 | | Water shots said effective in cooling Japanese re |
| 7 | | Japan scrambling to contain Fukushima crisis |
| 8 | | TEPCO FIRE BREAKS OUT AGAIN AT FUKUSHIMA |
| 9 | | Poll: Nuclearworries rising |
| 10 | | 1st LD Japan SDF helicopters dump water on two |
| 11 | | U.S. nuclear fuel pools raise concerns Plants hold |
| 12 | | Fukushima: Burning spent fuel rods spiked radiati |
| 13 | | Delays in policy on storing fuel rods compound cr |
| 14 | | Main developments in the aftermath of the earth |
| 15 | | Radiation levels down at Fukushima |
| 16 | | Has the water run out in vital cooling system? |
| 17 | | GSDF Starts Pouring Water into Fukushima React |
| 18 | | Urgent: Spraying boracic acid used to prevent rec |

290

Tokyo Electric Power Co Inc: Environmental :Company

| | |
|---|---|
| Companies | • Tokyo Electric Power Co Inc |
| Subjects | • Nuclear Accidents<br>• Poisonings<br>• Acute Radiation Syndrome |

Publication Name: Waterloo Region Record
Publication Date: March 16, 2011 Wednesday Headlines: Health effects of radiation poisoning By Sirneon BennettBloornberg News The danger of radiation leaks from Tokyo Electric Power's Fukushima Dai-Ichi nuclear plant is rising after explosions at the site caused by Japan's earthquake and tsunami, Prime Minister Naoto Kan said Tuesday.

Here are answers to some frequently asked questions about radiation poisoning. The information is drawn from the World Nuclear Association, the Science Media Centres of Japan and Australia, the World Health Organization in Geneva, the U.S. Centers for Disease Control and Prevention in Atlanta, and the U.S. Environmental Protection Agency in Washington.

Procurement Aid

The following categories include links to websites with information about that particular category. To view the website, click the link.

$ Resources ▼ | Help | Sign Out

Weather News

Weather News Story
May 01, 2012; 12:12 PM ET
Vivamus luctus, quam at cursus sagittis, turpis erat porta felis, lobortis malesuada mauris lectus at felis. Sed tellus lorem, ultricies a tern pus id, consequat a arcu. Ut sodales lectus et arcu vestibulum tempus. Aenean a risus eu ante...

Weather News Story
May 01, 2012; 12:12 PM ET
Vivamus luctus, quam at cursus sagittis, turpis erat porta felis, lobortis malesuada mauris lectus at felis. Sed tellus lorem, ultricies a tern pus id, consequat a arcu. Ut sodales lectus et arcu vestibulum tempus. Aenean a risus eu ante...

Weather News Story
May 01, 2012; 12:12 PM ET
Vivamus luctus, quam at cursus sagittis, turpis erat porta felis, lobortis malesuada mauris lectus at felis. Sed tellus lorem, ultricies a tern pus id, consequat a arcu. Ut sodales lectus et arcu vestibulum tempus. Aenean a risus eu ante...

Economic Resources

Economic resource sample link
Economic resource sample link
Economic resource sample link
Economic resource sample link
Economic resource sample link
Economic resource sample link

Environmental Resources

Environmental Category One
Economic resource sample link
Economic resource sample link
Economic resource sample link

Environmental Category Two
Economic resource sample link
Economic resource sample link
Economic resource sample link

Geo-Political Resources

Economic resource sample link
Economic resource sample link
Economic resource sample link

Legal/Compliance Resources

Economic resource sample link
Economic resource sample link
Economic resource sample link Go to Dashboard

FIG. 2D

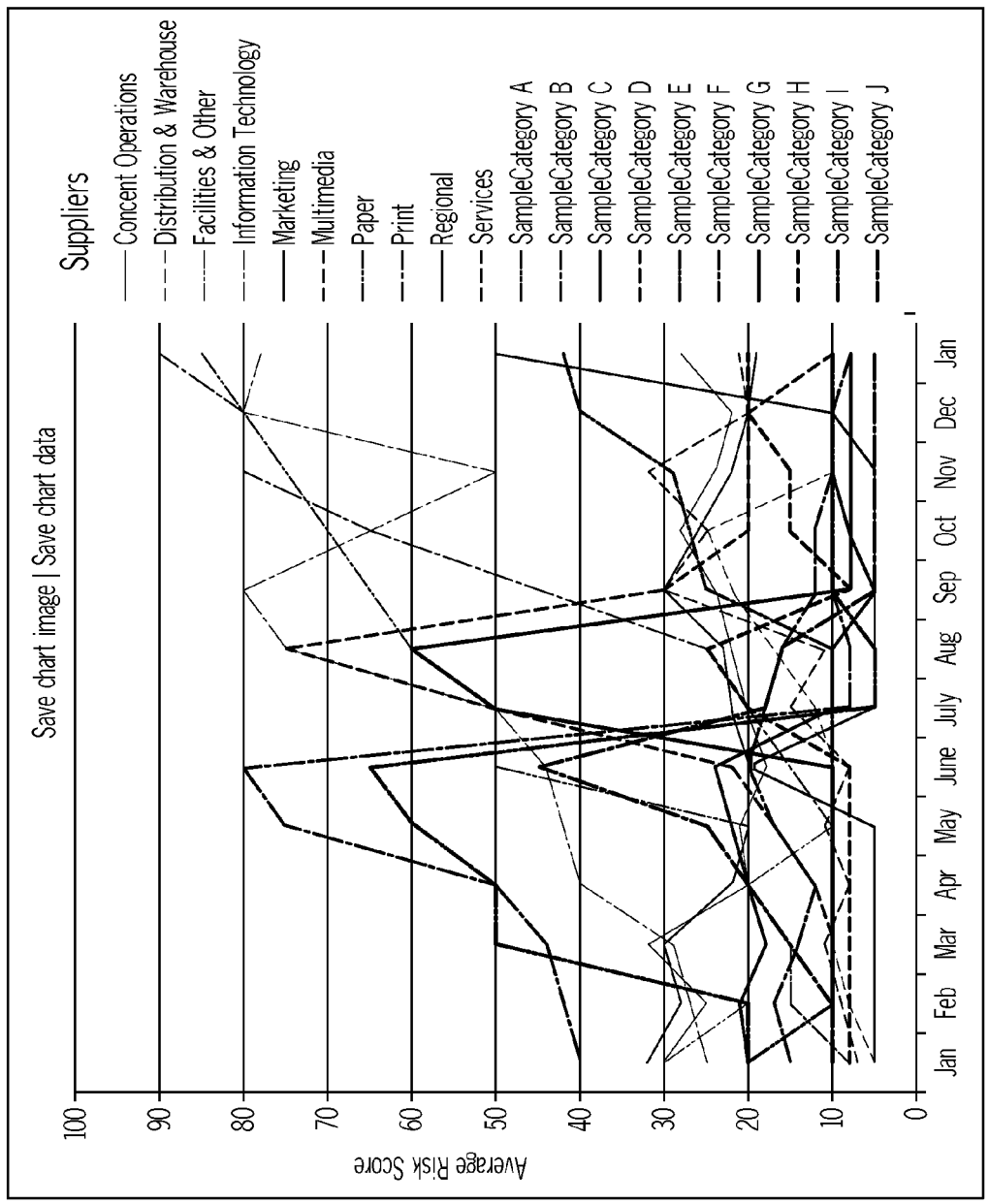
FIG. 3B(1)

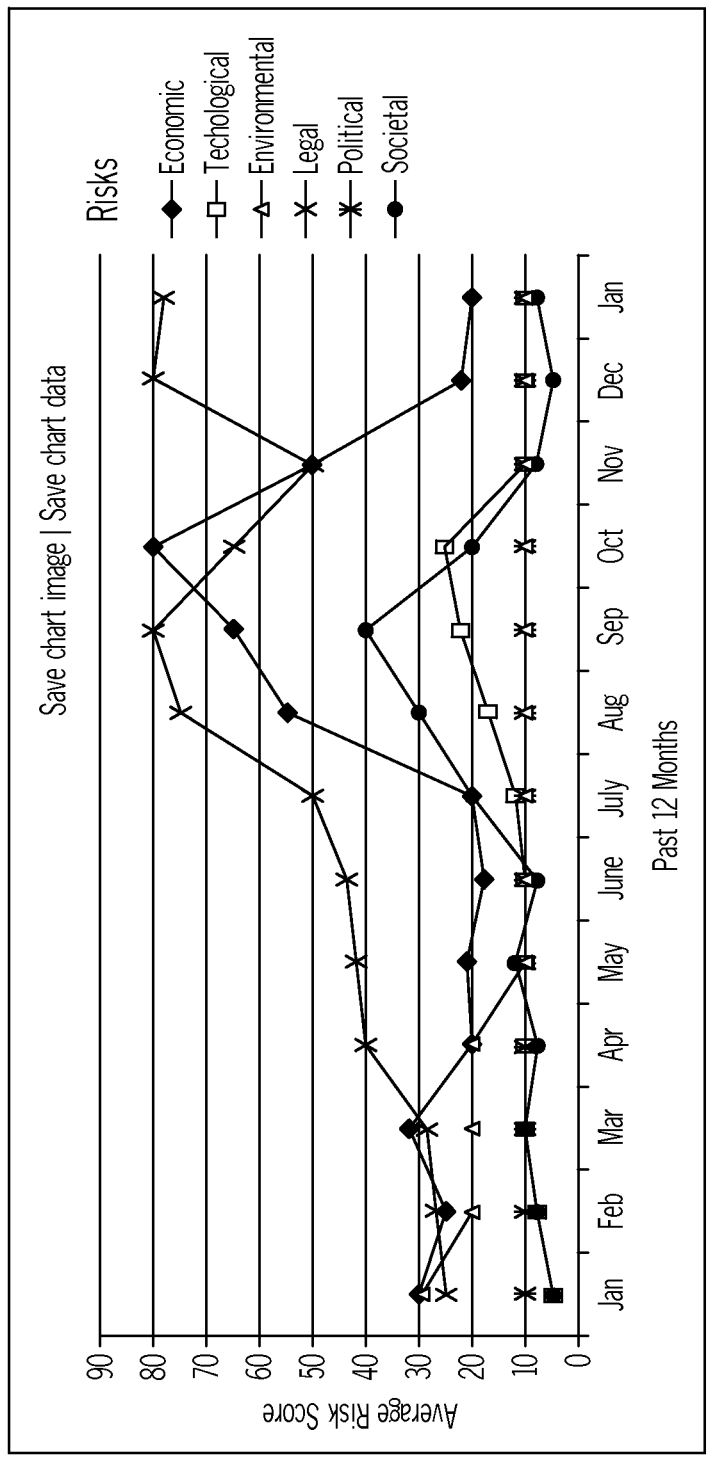
FIG. 3B(2)

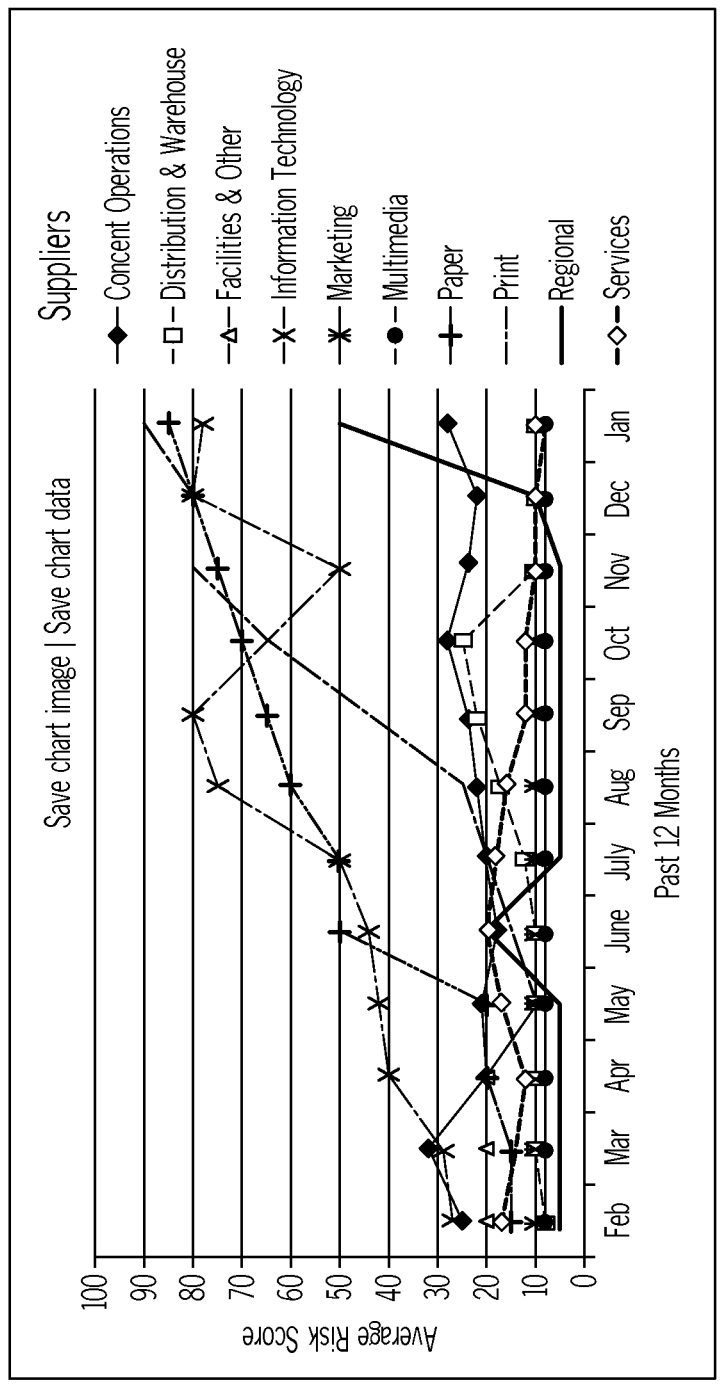
FIG. 3B(3)

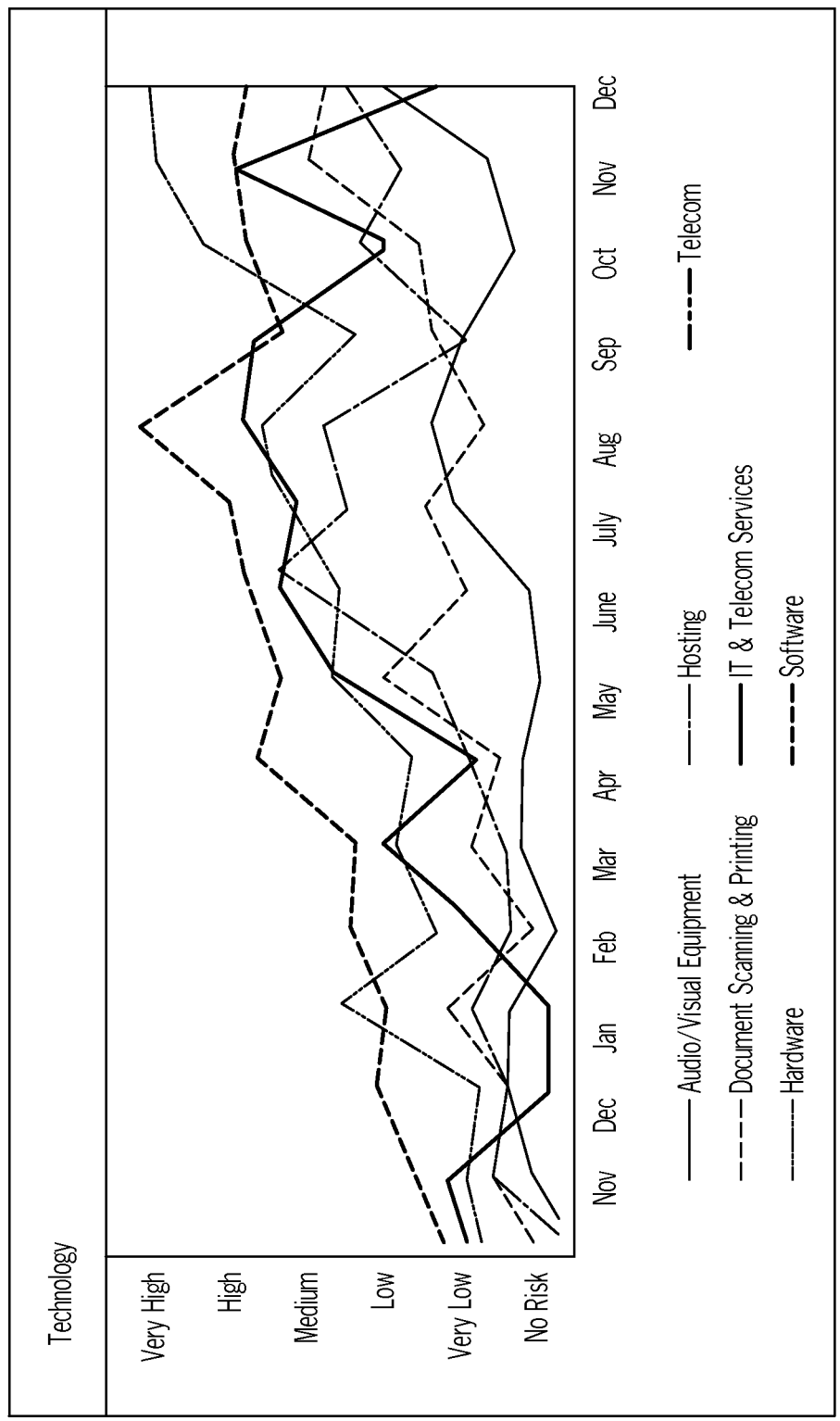
FIG. 3B(4)

Upload a List of Suppliers | Help | Sign Out

Suppliers subscribed: 500
Suppliers already loaded: 350
Suppliers available to load: 150

Follow this step-by-step process to upload your list of suppliers.

Step 1: Upload CSV file → Step 2: Disambiguation → Step 3: Review, Save, Download Supplier file
410 — [c:\leading_indicators\supplier_upload_files\suppliers.csv] [Browse] [Upload]

Review the information in the supplier table. If the data looks correct, click Next to continue the upload process.
145 suppliers were found

415

| Supplier Code | Supplier Code | Tier | Alternate Names | Company Validated | Industry Name | Industry Validated | City | Tier | Country | Location Validated | Include Location |
|---|---|---|---|---|---|---|---|---|---|---|---|
| 12345678 | Accenture | 1 | AT&T | | Software Development & Engineering | | Dayton | OH | United States | | ☑ |
| 12345678 | Supplier A | 1 | | | Telecommunication | | New York | NY | United States | | ☑ |
| 12345678 | Supplier B | 1 | | | Industry A | | City | NY | United States | | ☑ |
| 12345678 | Supplier C | 1 | | | Industry B | | City | NY | United States | | ☑ |
| 12345678 | Supplier D | 1 | | | Industry C | | City | NY | United States | | ☑ |
| 12345678 | Supplier E | 1 | | | Industry A | | City | NY | United States | | ☑ |
| 12345678 | Supplier F | 1 | | | Industry B | | City | NY | United States | | ☑ |
| 12345678 | Supplier G | 1 | | | Industry K | | City | NY | United States | | ☑ |
| 12345678 | Supplier H | 1 | | | Industry Q | | City | NY | United States | | ☑ |
| 12345678 | Supplier I | 1 | | | Industry A | | City | NY | United States | | ☑ |
| 12345678 | Supplier J | 1 | | | Industry B | | City | NY | United States | | ☑ |
| 12345678 | Supplier K | 1 | | | Industry C | | City | NY | United States | | ☑ |
| 12345678 | Supplier L | 1 | | | Industry A | | City | NY | United States | | ☑ |
| 12345678 | Supplier M | 1 | | | Industry A | | City | NY | United States | | ☑ |
| 12345678 | Supplier N | 1 | | | Industry B | | City | NY | United States | | ☑ |
| 12345678 | Supplier O | 1 | | | Industry K | | City | NY | United States | | ☑ |

[Next >]   [Return Home]

Upload a List of Suppliers

Help | Sign Out

Suppliers subscribed: 500
Suppliers already loaded: 350
Suppliers available to load: 150

Follow this step-by-step process to upload your list of suppliers.

| Step 1: Upload CSV file | Step 2: Disambiguation | Step 3: Review, Save, Download |

— 420

Click the colored icons to review and resolve ambiguities. All icons must show values have been validated (green) before you can move to the next step.

○ = Exact match found
⊕ = Multiple matches found
⊘ = No matches found = validated
● = Validated 145 suppliers were found 1 – 10 of 145

| Supplier Code | Supplier Name | Alternate Names | Tier | Company Validated | Industry Name | Industry Validated | City | State/Province | Country | Location Validated |
|---|---|---|---|---|---|---|---|---|---|---|
| 12345678 | ○ Accenture | | 1 | Accenture | ○ Software Development & Engineering | | Dayton | OH | ○ U.S. | Dayton, OH United States |
| 12345678 | ○ AT&T | | 1 | CC0009XUB AT&T | ○ Telecommunica | Telecommunica | New York | NY | ○ U.S. | New York, NY U.S. |
| 12345678 | ⊕ Supplier A | | 1 | | ○ Industry A | Indust STH987654 y | | NY | ○ U.S. | City, GX457867 |
| 12345678 | ○ Supplier C | | 1 | | ⊕ Industry C | | Bangalore | Kar | ○ India | Find Location |
| 12345678 | ○ Supplier J | | 1 | Supplier J | ○ Industry B | Industry A | City | NY | ⊕ U.S. | City, OH U.S. |
| 12345678 | ○ Supplier K | | 1 | Supplier K | ○ Industry C | Industry B | City | NY | ○ U.S. | City, OH U.S. |
| 12345678 | ⊘ Supplier L | | 1 | | ○ Industry A | Industry A | City | NY | ○ U.S. | City, OH U.S. |
| 12345678 | ⊘ Supplier J | | 1 | | ○ Industry B | Industry B | City | NY | ○ U.S. | City, OH U.S. |

510 — An exact match was found. You can still use a search variant for company name match. Please click to verify
— Multiple matches found. Please click to make selection
520 —
530 — No match was found. Please click to see options

⇐ | 1 | 2 | 3 | 4 | 5 | ... ⇒

Next >

Return Home

FIG. 5A

Upload a List of Suppliers

Help  Sign Out
Suppliers subscribed 500
Suppliers already loaded 350
Suppliers available to load 150

○ Supplier C Found

A matching supplier was found. Any additional close matches will also be displayed. Please select your supplier below. If you do not find the supplier you are looking for, you will need to search using an alternate supplier name.

Suppliers Available for Selection 3 previously disambiguated suppliers were found

| Company Validated | Industry Validated | Location Validated | | Dossier ID |
|---|---|---|---|---|
| ○ Supplier C | Computer Software, Development | Dayton, OH | United States | 12345678 |
| ○ Supplier C1 | Telecommunication | New York, NY | United States | 87654321 |
| ○ Supplier C Inc | Industry A | City, NY | United States | 78676577 |

1 matching supplier found

| Supplier Name | Web Address | City | State/Province | Country | Dossier ID | HQ | Ticker | Parent Company |
|---|---|---|---|---|---|---|---|---|
| ○ Supplier C1 A | www.webaddress.com | City | NY | United States | 12345678 | Yes | SLC | Supplier HQ |

Alternate names for supplier
○ [          ]
☐ Separate values with $ symbol

12345678 ○ Supplier J_1        ○ Industry B        ○ Industry B        ⇦ 1 2 3 4 5 ... ⇨

Next >

○ U.S.        Select  Cancel

Return Home

View and Edit Current List of Suppliers

Manage Suppliers & Tags | Set Risk Weights

Help | Sign Out

Suppliers subscribed: 500
Suppliers already loaded: 496
Suppliers available to load: 4

View: Suppliers | Tags

Delete tags | Supplier Actions ▼     Create new tag     Save entire supplier list

| ☐ | Supplier Code | Supplier Name | Alternate Names | Company Validated | View Tags | Industry Name | Industry Validated | City | Dashboard Chart ▼ | Location | Validated |
|---|---|---|---|---|---|---|---|---|---|---|---|
| | | | | | | | | | Tag/Chart name1 xxx | | |
| ☑ | 23904322 | ACME Software | | ACME Software | 1 | Software Development | Information Technology | Dayton A... locations | Tag/Chart name2 xxx | Dayton, OH United States | |
| ☑ | 12345678 | AT&T | | AT&T | 1 | Telecommuni... | Telecommuni... | New York | Tag/Chart name3 xxx | New York, NY U.S. | |
| ☑ | 12345678 | Supplier A | | Supplier A | 1 | Industry A | Industry A | City | Tag/Chart name4 xxx ates | City, NY U.S. | |
| ☑ | 12345678 | Supplier B | Supplier B1 | | 1 | Industry B | Industry B | City | Tag/Chart name5 xxx | City, NY U.S. | |
| ☑ | 12345678 | Supplier C | | Supplier C | 1 | Industry C | Industry C | Bangalore | Tag/Chart name6 xxx ates | City, NY U.S. | |
| | | | | | | | | | Tag/Chart name7 xxx | | |
| ☑ | 12345678 | Supplier I | | Supplier I | 1 | Industry A | Industry A | City | Tag/Chart name8 xxx ates | City, NY U.S. | |
| ☑ | 12345678 | Supplier J | | Supplier J | 1 | Industry B | Industry B | City | Tag/Chart name9 xxx | NY United States | City, NY U.S. |
| ☑ | 12345678 | Supplier K | | Frank's Glass | 1 | Industry C | Industry C | City | Tag/Chart name10 xxx | NY United States | City, NY U.S. |

← 1 2 3 4 5 ... →

Return Home

FIG. 6

CREATE NEW TAG

ENTER TAG DETAILS AND ADD IT TO THE ORGANIZATION.  (* = REQUIRED)

TAG NAME * [DASHBOARD CHART]

☐ NEST THIS TAG UNDER...

[SELECT A TAG ▽]

TAG WEIGHT * [5 ▽]   5 = MOST IMPORTANT
             1 = LEAST IMPORTANT

☐ INCLUDE TAG IN CHARTS LIST

[CREATE]  [CANCEL]

View and Edit Current List of Suppliers

| Manage Suppliers & Tags | Set Risk Weights |

Enter weights for each risk category. Enter 5 for most important, 1 for least important. To remove a risk category from the dashboard, 0 for the weight.

Economic risk [5 ▷] ~810
Technological risk [5 ▷] ~810
Environmental risk [5 ▷] ~810
Legal risk [5 ▷] ~810
Political risk [5 ▷] ~810
Societal risk [5 ▷] ~810

Help | Sign Out
Suppliers subscribed: 500
Suppliers already loaded: 495
Suppliers available to load: 5

800

Return Home

FIG. 8

| | | |
|---|---|---|
| 955 | MANUFACTURING COUNTRY | US |
| 954 | MANUFACTURING STATE | TN |
| 953 | MANUFACTURING CITY | BRENTWOOD |
| 952 | PRODUCT DESCRIPTION | MOBILE SCANNER |
| 951 | SUPPLIER CATEGORY LEVEL 1 | TRANSPORTATION |
| 940 | SUPPLIER TIEIR | 1 |
| 935 | INTERMEDIATE PARENT(S)? Y/N | N |
| 930 | ULTIMATE PARENT? Y/N | Y |
| 925 | CO-IDENTIFYING INFORMATION | www.tripack.com |
| 920 | ALTERNATE NAME | ACS EXPEDITED SERVICES OR XEROX EXPEDITED SERVICES |
| 915 | SUPPLIER NAME | AFFILIATED COMPUTER SERVICES - EXPEDITED SERVICES |
| 910 | SUPPLIER # | 1208046 |

(950 brackets rows 951–955)

FIG. 9

|   | A | B | C | D | E | F | G | H | I | J | K | L | M | N | O |
|---|---|---|---|---|---|---|---|---|---|---|---|---|---|---|---|
| 1 | Roll-up //Risk Weighting | | | Social Responsibility | | | Environmental/ Natural Hazards | | | Geo-political/Country Risk | | | Economic/Financial | | |
| 2 | | | | 5 | | | 4 | | | 2 | | | 4 | | |
| 3 | | Supplier Tier (1 = highest) | Weights | Content Score | Weighted Score | Formula | Content Score | Weighted Score | Formula | Content Score | Weighted Score | Formula | Content Score | Weighted Score | Formula |
| 4 | Department (e.g., Global Procurement/senior management) | | | | | 22.89 | | | 22.12 | | | 17.95 | | | 36.99 |
| 5 | Category A (e.g., IT) | | 5 | | | 33.67 | | | 32.53 | | | 26.40 | | | 54.40 |
| 6 | Subcategory A (e.g., software) | | 4 | | | 26.93 | | | 26.03 | | | 21.12 | | | 43.52 |
| 7 | Subcategory B | | 5 | | | 33.67 | | | 32.53 | | | 26.40 | | | 54.40 |
| 8 | Subcategory C | | 4 | | | 26.93 | | | 26.03 | | | 21.12 | | | 43.52 |
| 9 | Subcategory D | | 2 | | | 13.47 | | | 13.01 | | | 10.56 | | | 21.76 |
| 10 | Subcategory E | | 2 | | | 13.47 | | | 13.01 | | | 10.56 | | | 21.76 |
| 11 | Supplier A (the actual company) | 1 | | 23.00 | | | 12.00 | | | 66.00 | | | 68.00 | | |
| 12 | Supplier B (the actual company) | 2 | | 16.00 | | | 27.00 | | | 45.00 | | | 64.00 | | |

FIG. 15A

| | | | | | | | | | | | |
|---|---|---|---|---|---|---|---|---|---|---|---|
| 13 | Supplier C (the actual company) | 3 | 69.00 | | 33.00 | | 30.00 | | 50.00 | | |
| 14 | Supplier D (the actual company) | 3 | 18.00 | | 46.00 | | 80.00 | | 99.00 | | |
| 15 | Supplier E (the actual company) | 3 | 27.00 | | 21.00 | | 42.00 | | 13.00 | | |
| 16 | Supplier F (the actual company) | 2 | 85.00 | | 95.00 | | 22.00 | | 22.00 | | |
| 17 | | | | | | | | | | | |
| 18 | Tier 1 Average | | 23.00 | 23.00 | 12.00 | 12.00 | 66.00 | 66.00 | 68.00 | 68.00 | |
| 19 | Tier 2 Average | | 50.50 | 33.67 | 61.00 | 40.67 | 33.50 | 22.33 | 43.00 | 28.67 | |
| 20 | Tier 3 Average | | 38.00 | 12.67 | 33.33 | 11.11 | 50.67 | 16.89 | 54.00 | 18.00 | |
| 21 | SubCategory Score | | | | | | | | | | |
| 22 | Category B | 4 | | 26.93 | | 26.03 | | 21.12 | | | 43.52 |
| 23 | Category C | 3 | | 20.20 | | 19.52 | | 15.84 | | | 32.64 |
| 24 | Category D | 2 | | 13.47 | | 13.01 | | 10.56 | | | 21.76 |
| 25 | Category E | 3 | | 20.20 | | 19.52 | | 15.84 | | | 32.64 |

FIG. 15B

|  | Baseline | Sep. | Oct. | Nov. | Dec. | 2012 Jan | Feb. | March | April | May | June | July | Aug. | Sep. | Oct. | Nov. |  |
|---|---|---|---|---|---|---|---|---|---|---|---|---|---|---|---|---|---|
| UKPUBS article count |  | 277 | 250 | 232 | 158 | 194 | 274 | 258 | 234 | 264 | 247 | 258 |  |  |  |  |  |
| Change from Baseline | 238 | 38.95 | 11.95 | -6.05 | -80.05 | -44.05 | 35.95 | 19.95 | -4.05 | 25.95 | 8.95 | 19.95 | -238.05 | -238.05 | -238.05 | -238.05 | -23 |
| UK HTA Index |  | ⇧116% | ⇧105% | ⇧ 97% | ⇨ 66% | ⇨ 81% | ⇧115% | ⇧108% | ⇨ 98% | ⇧ 111% | ⇧104% | ⇧108% | ⇨ 0% | ⇨ 0% | ⇨ 0% | ⇨ 0% | ⇨ |
| FRPUBS |  | 8.2 | 104 | 169 | 105 | 112 | 147 | 216 | 93 | 230 | 138 | 113 |  |  |  |  |  |
| Change from Baseline | 141 | -58.8 | -36.8 | 28.2 | -35.8 | -28.8 | 6.2 | 75.2 | -47.8 | 89.2 | -2.8 | -27.8 | -40.8 | -40.8 | -40.8 | -40.8 | -1 |
| France HTA Index |  | ⇨ 58% | ⇨ 74% | ⇧120% | ⇨ 75% | ⇨ 80% | ⇧104% | ⇧153% | ⇨ 66% | ⇧163% | ⇨ 98% | ⇨ 80% | ⇨ 0% | ⇨ 0% | ⇨ 0% | ⇨ 0% | ⇨ |
| DUTPUBS |  | 262 | 356 | 351 | 342 | 239 | 190 | 370 | 290 | 148 | 195 | 208 |  |  |  |  |  |
| Baseline | 264 | -185 | 92.15 | 87.15 | 78.15 | -24.85 | -73.85 | 106.15 | 26.15 | -115.85 | -68.85 | -55.85 | -263.85 | -263.85 | -263.85 | -263.85 | -26 |
| NL HTA Index |  | ⇧ 99% | ⇧135% | ⇧133% | ⇧130% | ⇨ 91% | ⇨ 72% | ⇧140% | ⇧110% | ⇨ 56% | ⇨ 74% | ⇨ 79% | ⇨ 0% | ⇨ 0% | ⇨ 0% | ⇨ 0% | ⇨ |
| ZEITNG |  | 127 | 106 | 179 | 142 | 103 | 101 | 136 | 136 | 161 | 250 | 141 |  |  |  |  |  |
| Change from Baseline | 132 | -4.5 | -25.5 | 47.5 | 10.5 | -28.5 | -30.5 | 4.5 | 4.5 | 29.5 | 118.5 | 9.5 | -131.5 | -131.5 | -131.5 | -131.5 | -1 |
| DACH HTA Index |  | ⇧ 97% | ⇨ 81% | ⇧136% | ⇧108% | ⇨ 78% | ⇨ 77% | ⇧103% | ⇧103% | ⇧122% | ⇧190% | ⇧107% | ⇨ 0% | ⇨ 0% | ⇨ 0% | ⇨ 0% | ⇨ |
| USPPBS |  | 525 | 600 | 550 | 478 | 536 | 619 | 703 | 702 | 579 | 689 | 666 |  |  |  |  |  |
| Change from Baseline | 548 | -23.1 | 51.9 | 1.9 | -70.1 | -12.1 | 70.9 | 154.9 | 153.9 | 30.9 | 140.9 | 117.9 | -548.1 | -548.1 | -548.1 | -548.1 | -5 |
| USA HTA Index |  | ⇧ 96% | ⇧109% | ⇧100% | ⇨ 87% | ⇨ 98% | ⇧113% | ⇧128% | ⇧128% | ⇧ 106 | ⇧126% | ⇧122% | ⇨ 0% | ⇨ 0% | ⇨ 0% | ⇨ 0% | ⇨ |

FIG. 16

| HTA Index Name | Nexis Source Group | File-Name | Language | # of Publications | SmartIndex Term | Hits in past 12 months | Search string |
|---|---|---|---|---|---|---|---|
| UK | UK Publications | UKPUBS | English | 1000 | HUMAN TRAFFICKING | 2868 | |
| France | Toute la Presse | FRPUBS | French | 188 | TRAFIC DÊTRES HUMAINS | 1694 | |
| Netherlands | Dutch Language News - Full Text and Abstracts | DUTPUB | Dutch | 91 | NA | >3000 | Mensenhandel or Mensensmokkel |
| Germany | Publikationen aus Deutschland (German Publications) | GERPUB | German | 200 | MENSCHENHANDEL | 1524 | |
| DACH | Deutsche Presse (German Language News) | ZEITNG | German | 230 | MENSCHENHANDEL | 1581 | |
| USA | US Publications | USPPBS | English | 1840 | HUMAN TRAFFICKING | >3000 | |
| Canada | Canadian Publications | CANPUB | English | 86 | HUMAN TRAFFICKING | 1358 | |
| Global | All News, All Languages | ALLLNG | Dutch, English, Finnish, French, German, Italian, Portugese, Spanish, Swedish, | 5956 | | 2953 in past month | (Mensenhandel or Mensensmokkel or Ihmiskaupan or människohandel or Tráfico de pessoas or Trata de personas or comercio de personas or Il traffico di esseri umani or tratta di persone) or subject (human trafficking) |

FIG. 17

SYSTEM AND METHODS TO FACILITATE ANALYTICS WITH A TAGGED CORPUS

BACKGROUND

1. Field

The present specification generally relates to computerized analytics.

2. Technical Background

Globalization, lean operations, outsourcing, supply base complexity, all increase use of outsourcing and unprecedented number of supply chain disruptions. The average cost is estimated between $10M-$50M/year with corresponding damage to future stock returns. Supplier behavior can also damage an organization's corporate brand and shareholder value. Additionally, new laws (e.g., California Supply Chain Transparency Act) require organizations to publicly post how they maintain supply chain visibility. Manually monitoring all the Suppliers (which can number in the thousands for the average Fortune 1000 organization) and their problems is an impossible task. Quarterly financial scores, from an entity such as Dun & Bradstreet, are unlikely to be helpful in such a scenario as well since there wasn't a known financial risk to track. Also, this approach is not sufficient to catch important events in time to mitigate or avoid threats to their supply chain—by the time a quarterly report has run, the damage may be done. Additionally, entities may have Suppliers with multiple manufacturing facilities around the globe. For instance, when a tsunami hits an industry-heavy location, a customer may spend days calling Suppliers to find out who was impacted because they have no way of matching Suppliers to locations.

Current monitoring tools have significant deficiencies including an inability to automatically coordinate events, Suppliers, locations and industries across a corpus of content as well as evaluate/score and surface that content. Therefore, a need exists to collect and analyze data to highlight potential risk scenarios in advance of a situation to avoid possible negative outcomes such as compliance/SOX/monetary failures/losses. These risks may come from unreliable/bad Suppliers (e.g., financial distress, product recalls, ethical issues or simply macro location or industry-based events, such as the Japan tsunami that created massive supply chain disruptions in the computer and auto industries).

In other embodiments, there is a need for a monitoring tool to act as a zeitgeist tracker particularly one that can measure awareness of issues in a specific geographic region as well as across multiple regions or even globally for comparison purposes. Prior art systems and methods might measure the frequency of word terms in a sample set but the results from such analytics are unreliable because a long article, using a keyword with a high frequency, can skew the result. Thus, a system to measure the prevalence of topics based on the number of articles in which certain concepts appear is needed.

Thus, there is a need in the industry for a comprehensive monitoring tool. There is a further need for such a tool focused analysis of supply chain management. Monitoring can come in many forms including focused and comparative consciousness/zeitgeist tracking across geographic regions. Monitoring may also be used to identify areas of opportunity for sales or alternative vendor/Supplier relationships.

SUMMARY

Embodiments of the systems comprise multiple levels of functionality as well as varying depth and breadth in the graphical user interfaces generated by such embodiments.

In one embodiment, a system may be configured to perform analytics to facilitate issue awareness comprising at least one computer-readable storage medium on which a database management system is stored and configured to access an index of metadata corresponding to content items in a corpora of electronically stored content. It may also include at least one sub-system configured to generate at least one interactive graphical user interface (GUI) for display on a computer-based visual sub-system. It may also include at least one sub-system configured to receive a query request configured by a user in said interactive GUI wherein said query request includes a user-defined threshold. It may also include a computer machine configured to receive said query as computer machine input; search a set of metadata tags stored in said index for at least one term contained in said query; identify a set of metadata tags which match said query; identify at least one document, in said corpora, which is associated with said set of metadata tags; calculate a content score for each document identified in the previous step; if said content score exceeds said user-defined threshold, surface said document; calculate a summary score for a set of documents surfaced in the previous step based on the content scores associated with said documents; generate for graphical display a second interactive user interface to communicate said summary score wherein said second GUI is configured to permit a user to click through said summary score.

In another embodiment, a user may be permitted to click through said summary score to reveal a set of documents from which said summary score was derived. Alternatively, a system may reveal a list of document titles representing a set of documents from which said summary score was derived with click through functionality for each title in said list to display a document associated with said title.

A system may include a database for storing a metadata index and a corpora of documents and a GUI. Such a system may be further configured to search a metadata index for tags to identify a set of documents, calculate various scores and summaries and generate a graphical display of those results that may be clicked through to reveal the underlying data which developed those scores.

In another embodiment, the query may include at least one entity profile, a method to calculate a summary score by averaging certain underlying document scores which may be displayed in a grid. A system may be further configured to include at least one entity in said query request. It may further average said content scores for said set of surfaced documents for each of said at least one entity to develop a summary score. Then it may display each summary score in a grid via the second GUI.

In another embodiment, an entity profile may comprise a set of tags as well as other score calculations such as tier scores and supplier category scores. A system may be configured so that an entity profile associated with said entity comprises a set of tags, a supplier tier, a supplier tier weight, a supplier category, and a supplier category weight and wherein said set of tags in said entity profile are included in said query. The query request may comprise a risk category weight. Then the system may be further configured to calculate a tier score by averaging said summary scores for all entities assigned to a given tier; a weighted tier score for said tier by applying said tier weight; and a supplier category score by selecting a maximum score associated with a supplier within a given supplier category and applying a supplier category weight.

In another embodiment, a query request comprises at least one entity profile and at least one risk category and risk category weight. The summary score averages said content scores for said set of surfaced documents for each of said at least one entity profile in each of said at least one risk category; and said second GUI displays each summary score in a grid juxtaposing a set of suppliers against a set of risk categories.

In another embodiment, risk categories may be chosen from the list consisting of environmental issues, economic issues, societal issues, political issues, technology issues, business-specific issues and legal issues.

In another embodiment, the second GUI is further configured to expand said set of risk categories into a set of risk dimensions comprising a company perspective, an industry perspective, and a location perspective. The summary score for the company perspective may be based on a subset of said surfaced documents comprising a match with at least one company name associated with said entity profile. The summary score for said industry perspective may be based on a subset of said surfaced documents comprising a match with at least one industry tag associated with said entity profile. The summary score for said location perspective may be based on a subset of said surfaced documents comprising a match with at least one location tag associated with said entity profile.

In another embodiment, an administrative subsystem may be configured to generate for graphical display on a computer-based visual sub-system an interactive administrative GUI to allow a user to configure at least one entity profile. An administration subsystem may comprise a computer machine configured to Generate for Graphical Display and perform processing associated with setting up the system prior to use by an end-user. The entity profile may include a supplier and a set of tags associated with said supplier including a supplier tier, a supplier tier weight, a supplier category, and a supplier category weight. The administrative subsystem may then receive and store said entity profile in a computer-readable storage medium.

In another embodiment, a system may be configured so that the query request comprises at least two time periods and at least one geographic designation. The query request further includes a subject chosen from a set of subjects contained in said metadata index. The summary score counts said set of surfaced documents for each of said at least two time periods. The second GUI then graphically compares said summary score associated with each of said at least two time periods.

In another embodiment, the query request may be further configured so that the at least two time periods comprise a baseline time period and a second time period and the threshold comprises a minimum relevance level.

In another embodiment, the index of metadata comprises a set of geographic tags and wherein each content item in said corpora of electronically stored content is associated with a tag corresponding to said content item's region of publication.

In another embodiment, the second GUI graphically displays said summary scores for each of said geographic designations.

In another embodiment the query request may be further configured by providing a set of weights to use as computer machine input to determine if a document meets or exceeds said minimum relevance level wherein said set of weights are associated with said subject's location and frequency in said document.

In another embodiment, a method may perform analytics to facilitate issue awareness comprising accessing, from an operational database, at least one profile for a supplier comprising a set of tags, a tier, a tier weight, a category, a category weight, a sub-category and a sub-category weight. It may also perform the step of accessing, via said operational database, an index of metadata associated with a corpora of electronically stored content. Next the method may perform by automatically matching, using a computer machine, a document from said corpora to said profile wherein said set of tags associated with said supplier profile match a set of terms in said index of metadata associated with said document. Scores may be derived by calculating, using a computer machine,
 a base document score for said document;
 for a given supplier, an average base document score by averaging all said base document scores for a given supplier;
 a tier content score by averaging said average base document score for all suppliers within a given tier;
 a weighted tier score for said tier by applying a tier factor;
 a subcategory risk score by applying a subcategory risk weight to a maximum weighted tier score within said subcategory;
 a category risk score by applying a category risk weight to a maximum subcategory risk score within said category;
 a departmental risk score by averaging all category risk scores within said department.

This embodiment may perform by generating, using a computer machine, at least one interactive graphical user interface comprising a risk grid having a supplier axis and a risk category axis wherein said supplier axis is organized in a taxonomy with a highest level being a departmental row, a next level being a category row; a next level being a subcategory row and a next level comprising a row assigned to each supplier falling into that taxonomy and said risk category axis provides a column for each risk category within a set of risk categories; each cell within said risk grid comprises a representation of a risk score calculated for an intersection of said supplier axis level and said risk category; each cell within said risk grid may be clicked through to reveal a list of content sources from which said risk score derived; and each item in said list of content sources may be clicked through to reveal an underlying document for said item.

In another embodiment, a method to perform analytics to facilitate issue awareness may comprise accessing, from an operational database, at least one profile for a supplier comprising a set of tags, a tier, a tier weight, a category, a category weight, a sub-category and a sub-category weight. It may further comprise accessing, via said operational database, an index of metadata associated with a corpora of electronically stored content. It may further comprise automatically matching, using a computer machine, at least one document from said corpora to said profile wherein said set of tags associated with said supplier profile match a set of terms in said index of metadata associated with said document. It may further comprise calculating, using a computer machine, a base document score for said document; and determining, using a computer machine, a score for said supplier with an algorithm using said base document score and said profile for said supplier as computer machine input. It may further comprise generating, using a computer machine, at least one interactive graphical user interface comprising said score for said supplier wherein said at least one document can be accessed by clicking on an icon representing said score for said supplier.

In an embodiment, the previously described method may utilize an index of metadata comprising a list of risk categories.

In another embodiment, the list of risk categories may comprise a taxonomy of issues including environmental issues, economic issues, societal issues, political issues, technological issues, business-specific issues, and legal issues. A taxonomy is a classification or categorization of things into a hierarchy.

In another embodiment, the base document score will be lower if a set of metadata associated with said base document matches a predetermined list of risk subjects wherein said risk subjects are organized into said taxonomy of risk categories.

In another embodiment, the base document score comprises a risk event if said base document score negatively affects said score for said supplier.

In another embodiment, a computer-readable medium comprising computer-executable instructions for execution by a computer machine to perform analytics to facilitate issue awareness that when executed, cause the computer machine to receive a query including a supplier profile. It may access at least one profile for a supplier, from a computerized database, comprising a set of tags, a tier, a tier weight, a category, a category weight, a sub-category and a sub-category weight. It may access an index of metadata, stored on a computer-readable medium, associated with a corpora of electronically stored content. It may match a document from said corpora to said profile. It may calculate a base content score for said document wherein said set of tags, associated with said supplier, match a set of terms in said index associated with said document. It may calculate a tier content score by averaging said base content score for all suppliers within a given tier. It may calculate a weighted tier score for said tier by applying a tier factor. It may calculate a subcategory risk score by applying a risk subcategory factor and a subcategory factor to a maximum weighted tier score within said subcategory. It may calculate a category risk score by applying a category risk factor to a maximum subcategory risk score within said category. It may calculate a departmental risk score by averaging all category risk scores within said department. It may generate at least one interactive graphical user interface comprising a risk grid having a supplier axis and a risk category axis wherein said supplier axis is organized in a taxonomy with the highest level being a departmental row, the next level being a category row; the next level being a subcategory row and the next level comprising a row assigned to each supplier falling into that taxonomy; said risk category axis provides a column for each risk category within a set of risk categories; each cell within said risk grid comprises a representation of a risk score calculated for an intersection of said supplier axis level and said risk category; each cell within said risk grid may be clicked through to reveal a list of content sources from which said risk score derived; and each item in said list of content sources may be clicked through to reveal an underlying document for said item.

In another embodiment, a computer-readable medium comprising computer-executable instructions for execution by a computer machine may generate the interactive GUI comprising a risk grid with the additional functionality to allow a user to expand or collapse said supplier axis to reveal or hide a given level within said taxonomy and to expand or collapse said risk category axis to reveal or hide a set of risk perspectives associated with each risk category when executed.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1B represents a dashboard GUI Generated for Graphical Display on a visual sub-system comprising a pop-up risk assessment for a Technology Supplier.

FIG. 2A represents a dashboard GUI Generated for Graphical Display on a visual sub-system comprising a Technology Risk Grid with accumulated and expanded views.

FIG. 2B represents a dashboard GUI Generated for Graphical Display on a visual sub-system comprising a pop-up Risk Score/content summary of a given Risk Type and Risk Perspective for a Supplier.

FIG. 2C represents a second window of a set of content, associated with a source in FIG. 2B's content summary, Generated for Graphical Display on a visual sub-system.

FIG. 2D represents a GUI Generated for Graphical Display on a visual sub-system comprising a set of content sources aligned with different Risk Types.

FIGS. 3B(1-4) represent a variety of possible GUIs Generated for Graphical Display on a visual sub-system comprising a set of Supplier/risk graphs.

FIG. 4 represents a GUI Generated for Graphical Display on a visual subsystem comprising an administrative interface to upload a list of Suppliers.

FIG. 5A represents a GUI Generated for Graphical Display on a visual subsystem comprising an administrative interface to disambiguate a list of Suppliers.

FIG. 5B represents a GUI Generated for Graphical Display on a visual subsystem comprising a second administrative interface to disambiguate a list of Suppliers.

FIG. 5C represents a GUI Generated for Graphical Display on a visual subsystem comprising a third administrative interface to categorize a Suppliers' Industry.

FIG. 6 represents a GUI Generated for Graphical Display on a visual subsystem comprising another administrative interface to organize Tags associated with a set of Suppliers.

FIG. 7 represents a GUI Generated for Graphical Display on a visual subsystem comprising an administrative interface for setting and weighting Tags.

FIG. 8 represents a GUI Generated for Graphical Display on a visual subsystem comprising an administrative interface for setting and weighting Risk Categories FIG. 9 represents a data structure stored on a computer readable medium which defines a Supplier.

FIGS. 15A-B represent a sample spreadsheet portraying one method of rolling up scores.

FIG. 16 represents one possible output chart for an embodiment of the invention.

FIG. 17 represents an embodiment of Computer Machine Input.

DETAILED DESCRIPTION

Figure 1A:
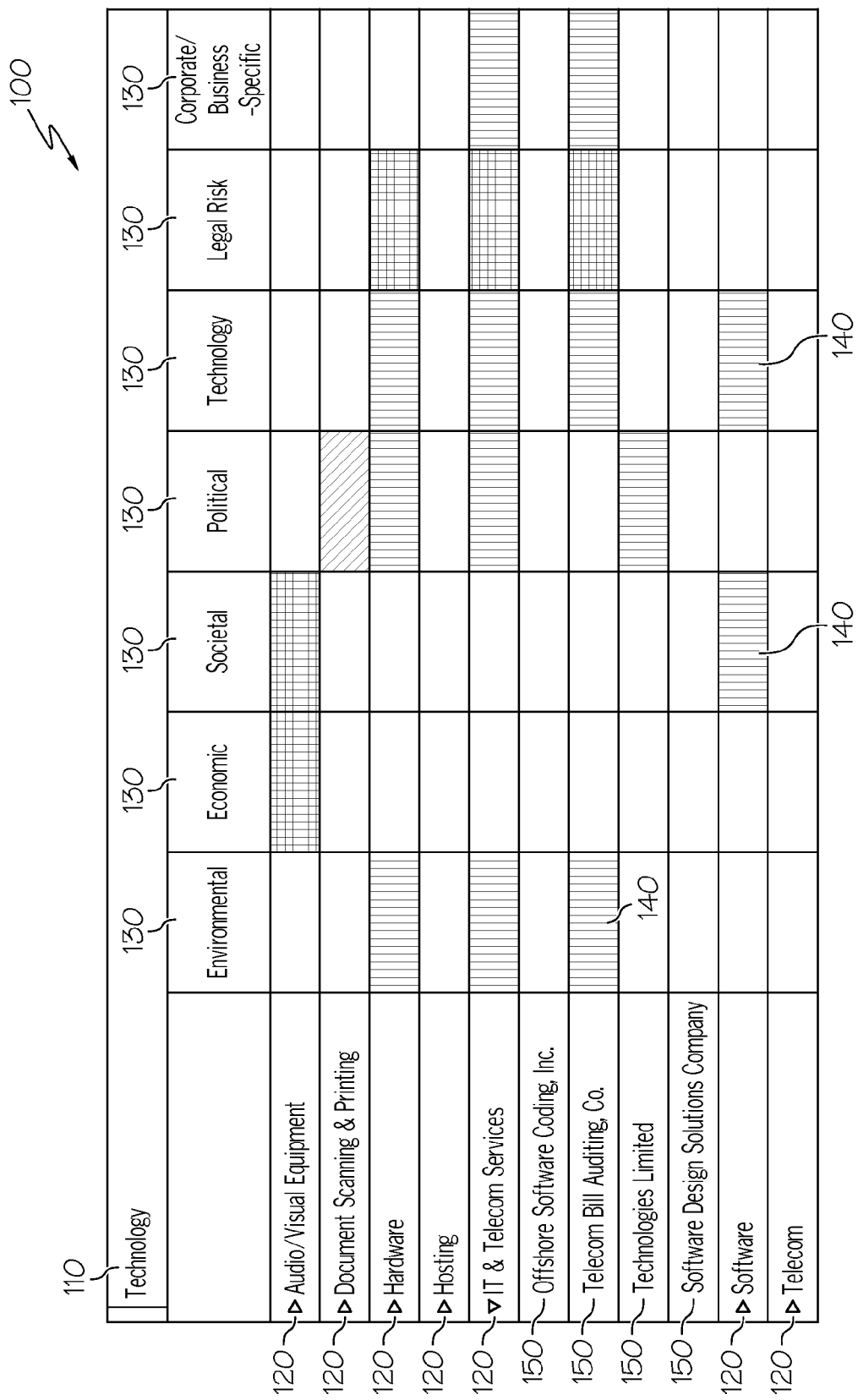
FIG. 1A represents an exemplary dashboard GUI Generated for Graphical Display on a visual sub-system comprising a Technology Risk Grid. We usually use exemplary in describing drawings . . . .

The drawings, systems and methods described herein relate to analyzing a variety of data and graphically generating conclusions regarding that data. As discussed herein, systems and methods allow departments (e.g., procurement departments) to proactively mitigate risks and discover opportunities associated their third-party relationships using various embodiments of the system/method described herein to extract, analyse and connect events, Suppliers, industry, and location may be extracted from a corpus of content (including, but not limited to, aggregation of news sources, public records, legal content, company profiles, financial sources, industry sources, executive/biographical sources, and licensed content sources). These sources (or a subset thereof) can provide the basis for risk calculations based on operational events (e.g., strikes or technology issues, natural disasters, product recalls, reputational risks, changes in commodity pricing, compliance issues, regulatory changes, and many more). Embodiments may provide the ability to drill down to even the Supplier's Suppliers which may impact the Suppliers' ability to deliver products.

Embodiments of the system may generate a variety of dashboards, with drill-down (e.g., click-through, hover, etc.) functionality, ranging from a high-level overview of Supplier risks by Risk Category (e.g., geopolitical, weather, regulatory, compliance, reputational) to more finite analyses or even the underlying content used to analyze an area of risk. Embodiments of both the system(s) and the dashboard(s) may provide mechanisms/means for prioritizing/alerting the analysis of risks/opportunities and their presentation via a dashboard.

Definitions

"Automatically" includes the use of a machine to conduct a particular action.

"Calculate" includes Automatically determine or ascertain a result using Computer Machine Input.

"Computer Machine" includes a machine (e.g., desktop, laptop, tablet, smartphone, television, server, as well as other current or future computer machine instantiations) containing a computer processor that has been specially configured with a set of computer executable instructions.

"Computer Machine Input" includes input received by a Computer Machine through a variety of means (e.g., HTTP, multi-modal entry, database query, etc.).

"Generate for Graphical Display" includes to Automatically create, using Computer Machine Input, an object(s) to be displayed on a GUI (e.g., a listing of hyperlinks, a heat map, a dashboard comprising a table, icon, and color-coding, etc.).

"GUI" or "Graphical User Interface" includes a type of user interface that allows users to interact with electronic devices via images (e.g., maps, grids, panels, etc.) displayed on a visual subsystem (e.g., desktop monitor, tablet/phone screen, interactive television screen, etc.).

"Metadata" includes to a type of data whose purpose is to provide information concerning other data in order to facilitate management and understanding. It may be stored in the document internally (e.g. markup language) or it may be stored externally (e.g., via a database such as a relational database with a reference to the source document that may be accessible via a URL, pointer, or other means).

"NAICS" includes to a system of classification which classifies establishments by their primary type of activity which replaced/supplemented the Standard Industrial Classification (SIC) starting in 1997.

"OFAC" includes to a sanction list provided by the US Department of the Treasury's Office of Foreign Asset Control (OFAC) which requires specific action(s) under US regulations including but not limited to freezing assets, rejecting transactions and/or reporting potential matches to OFAC for instruction and follow-up. Matches typically must be reported to OFAC within 10 days. Lists may include:

"OFAC" includes Specially Designated Nationals (SDN). Non-SDN, including Palestinian Legislative Council (PLC). Enhanced Sanctioned Countries Office of Foreign Assets Control.

"PEP" includes Politically Exposed Persons. On Rosetta, the World Compliance PEP file provides a comprehensive database of "Politically Exposed Persons" (PEPs), their family members and close associates.

A "Risk Category" comprises a grouping of issues that may have a negative impact on an aspect of operations such as environmental, economic, societal/reputational, political or geo-political, technology, operational, and legal.

A "Risk Dimension/Perspective" comprises a subset of a Supplier Category. In an embodiment, a Risk Dimension may focus on a Company. In another embodiment, a Risk Dimension may focus on an Industry (e.g., pharmaceutical, high-tech, agriculture). In another embodiment, a Risk Dimension may focus on a Location. Risk Dimensions may be portrayed alone or in groups.

A "Risk Event" comprises an event from a Risk Category/Subject that may have a negative impact on a Supplier or Supplier Category. These may include environmental events (including, but not limited to, natural and manmade disasters such as hazards, oil spills, tsunamis, tornados, EPA investigation against Suppliers, pollution, and more), economic events (news of layoffs, plant closings, bankruptcy, executive moves, macro indicators such as recessional impacts across industries, volatility of commodity prices, and other predictors of company distress), societal/reputational events (news impacting Supplier's brand/reputation including child labor, human rights violations, product recalls, compensation issues, or other ethical issues), political/geo-political events (country-based risk upon leadership changes, riots, terrorism), technology/operational events (cybertheft and other computer crimes, strikes, port closures, product quality or service issues, product recalls and more), and legal/litigation events (patent infringement, customer/shareholder lawsuits, government agency investigations or inspections, compliance issues, sanctions, watch lists, and other legal problems). Risk events are not necessarily exclusive to a single Risk Category/Subject. Risk Events may be selected from a predefined taxonomy (e.g., LexisNexis SmartTagging) that may be updated as new terms are identified.

A "Risk Subject" comprises a grouping of sub-issues that can be mapped into a taxonomy structure based on Risk Categories. A Risk Subject may map to one or more Risk Categories. In a preferred grouping or a preferred taxonomy, there may be hundreds or even thousands of possible subjects including, but not limited to, or variants of the following: product recalls, bankruptcy, boycotts, bribery, natural disasters, investigations, chemical & biological terrorism, slavery or forced labor, negative news—Business, Identity Theft, Corporate Insolvency, Plant Closures, Eco-terrorism, Pesticides, Layoffs, Internet Crime, Human Rights Violations, Wrongful Termination, Wage Violations, Child Labor, Lockout, Product Quality Issues, Sweatshops, Strikes, Conflict Minerals Violations, False or Misleading Advertising, Labor Unions/Labor Problems, Pollution, Pharmaceutical Drug and Devices, Adverse Drug Event Reporting, Human Trafficking, Patent Infringement, Drug & Medical Device Approval, Toxic & Hazardous Substances, Geo-Political Risks, FDA Approvals, Corporate Insolvency, Products Liability, Ethical Issues, Biological Contaminants, Professional Negligence, FDA Review, Carcinogens, Human Exposure Assessment, Pharmaceutical Drug and Devices Litigation, Mergers & Acquisitions, Safety and Workplace Health Issues, Executive Moves, Hazardous Waste, Operational Issues, Commodities, Agricultural Wastes, Sexual Harassment in Employment, Litigation, Tsunami, FCPA/Anti-Corruption Violations, Financial Distress, Heavy Metals & Toxic Minerals, Embargoes & Sanctions, and more. A set (including subsets, expansions and variants) of subjects/tags/taxonomies such as those used in the LexisNexis Smart Indexing may be mapped to the Risk Categories. Any given Risk Subject may also be a parent to one or more sub-Risk Subjects. Risk Subjects may be coded with a set of search terms, weights, sensitivities, and filters to prioritize the risk presented by a particular source within a corpus of content. This may further inform the calculation of the Risk Score. Also, a given Risk Subject may be coded to surface regardless of the Risk Score calculated if other criteria are fulfilled (e.g., a must-surface tag or a death match tag).

A "Risk Rating/Score" comprises an assessment of the level of risk associated with one or more Risk Categories or Risk Events. It may be presented in numeric, color-coded, shaded or other formats.

"Risk Weight" comprises a Risk Category attribute which defines a given Risk Category's relative level of importance against other Risk Categories.

"Smart Indexing" comprises a methodology by which subject matter experts and information professionals create vocabularies and the algorithmic rules governing the application of Tags to a content item.

A "Supplier Category" comprises an aspect of procurement/content operations.

A "Supplier Category Tag" includes a Tag which associates a particular Supplier Category with a Supplier. It may or may not include a Tag Weight defining the importance of that Category in assessing a specific Supplier.

"Surfacing" comprises a variety of methodologies employed to made content stored in servers and connected to the Internet (or other network system) available for further review or selection. Content made available through surfacing may comprise a hierarchy of computer-selectable links delivered as a result set to a query.

"Tag" includes metadata/keywords used to classify information. Tags may be organized in a taxonomy or hierarchy which includes nested components. Tags may also include an attribute to allow a user to define a Tag Weight to be associated with the Tag.

"Tag Weight" includes a Tag attribute which defines a given Tag's relative level of importance against other Tags.

"Zeitgeist" comprises the spirit, attitude, or general awareness of a specific issue within a specific time or period especially as it is reflected in literature (e.g., newspapers and other published sources).

Dashboards

Figure 1B:
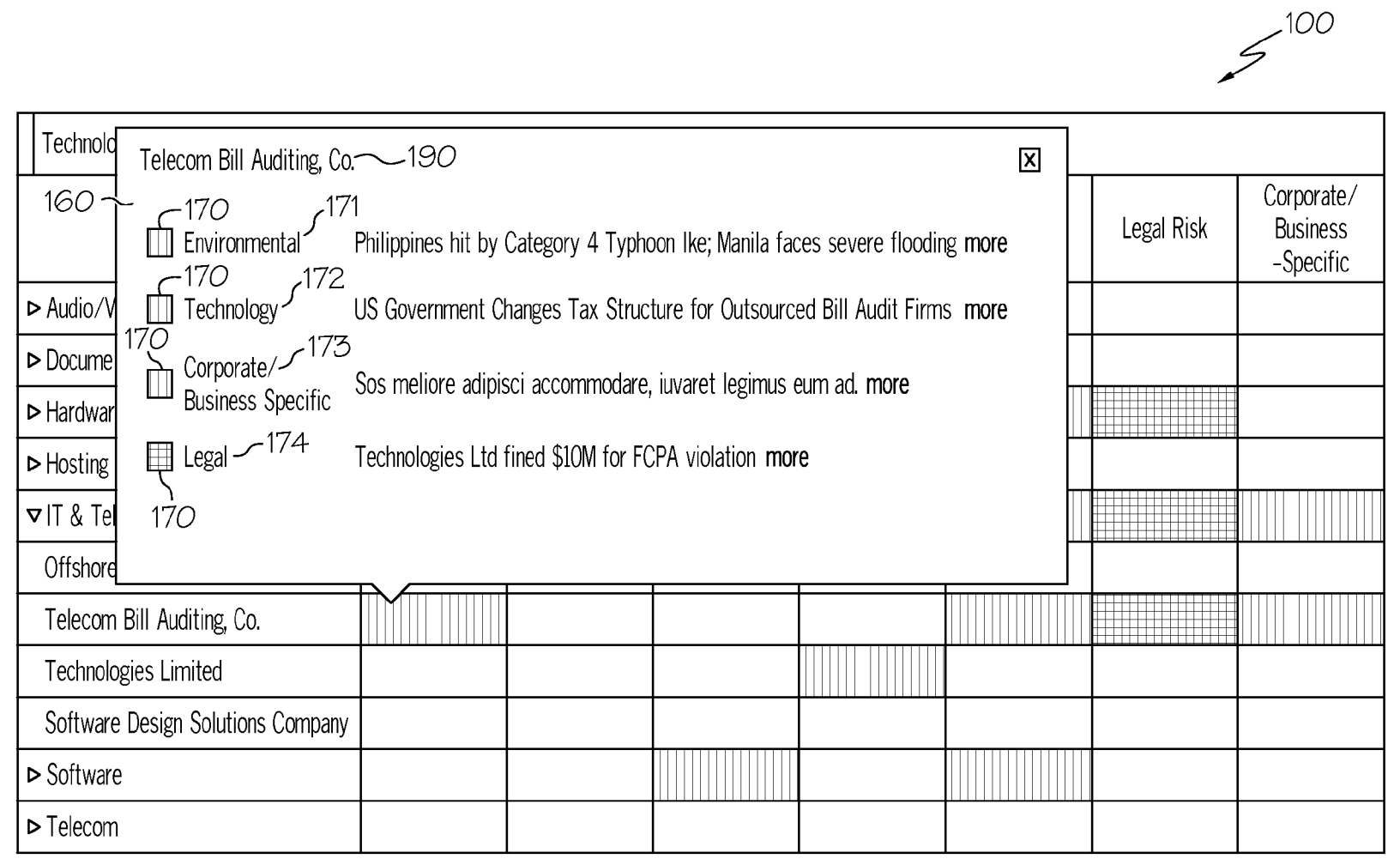

Referring to FIGS. 1A-1B, embodiments of the systems may Generate for Graphical Display different types of dashboard views (100 and etc.) that can convey a variety of risk assessments both vertically (within a specific industry, e.g., technology) and horizontally (across multiple types of Suppliers, e.g., hardware, software, services, etc.). An embodiment may also provide the ability to Generate for Graphical Display a representation of different layers of risk from a high-level representation depicting a comparison of Risk Scores for multiple Supplier Categories/Suppliers (see, FIG. 1A) to more focused snapshot (see, FIG. 1B) of Risk Scores associated with a particular Supplier. An embodiment may have the ability to Generate for Graphical Display drilled-down or consolidated/accumulated dashboard views to provide a user with varying levels of information.

Referring to FIG. 1A, this embodiment Calculates then Generates for Graphical Display a set of Risk Scores (140) at the intersections of Supplier Categories (120) and Risk Categories (130) for a higher level Supply Category (110). An embodiment of this dashboard may also allow expansion of a set of Supplier Categories (120) to Generate for Graphical Display a Risk Score (140) across Risk Categories (130) for both Supplier Categories (120) and hierarchically nested children Suppliers (150).

Referring to FIG. 1B, an embodiment may utilize a pop-up (160) to display Risk Scores (170) for a specific Supplier (190). A pop-up (160) for "Telecom Bill Auditing" (190) displays a set of four color-coded Risk Categories (171-174) (in this example, shading designates the level of severity although other mechanisms, such as color, may be utilized to convey that information): Environmental, Technology, Corporate-Business Specific and Legal.

Referring to FIG. 2A, another embodiment may Generate for Graphical Display a dashboard (100) in a table format which allows a user to interactively drill down to more finite information by parsing each Risk Category (230) (e.g, Environmental) into a set of Risk Dimensions/Perspectives (e.g., Company (231)/Industry (232)/Location (233)). At the Supplier Category level (240) (e.g. Content Operations), the Risk Dimensions/Perspectives (230) may be filled in to indicate an associated Risk Score (234). At the individual Supplier level (270) (e.g., 365 Media Group), each cell may provide an iconic indicator (260) (e.g., a bubble) of the Risk Score to visually communicate the greater degree of granularity. It should be kept in mind that other schemes, capable of being scanned easily by a reviewer, could also be employed.

Referring to FIG. 2B, further data may be accessed by clicking on the iconic indicator (260) which will Generate for Graphical Display an interactive summary (270) or set of links (276), for a set of Surfaced content sources (275) for a given Supplier (e.g., Cypress Semiconductor Corporation) and their associated Risk Scores (274) within a given Risk Type (e.g., Economic) within a Category of Suppliers (e.g. Telephone) for a given Department (e.g., Technology). Referring to FIG. 2C, a link in a set of links may be clicked through to Generate for Graphical Display a content window (280) associated with that headline (290).

Referring back to FIG. 2B, it can be seen the Risk Score (274) for Cypress Semiconductor Corporation Calculated for the Economic Risk Perspective and Company Risk Dimension may be based on three Risk Scores of 50 and two Risk Scores (274) designated with an exclamation point (to indicate automatic surfacing). Referring to FIG. 2C, an additional pop-up window (280) is Generated for Graphical Display to provide the content of a given content source (e.g., "Heath Effects of Radiation Poisoning"). Referring to FIG. 2D, a set of links may be Generated for Graphical Display to provide a user with a set of content, links, or other information (e.g., links to government sites, NGO/watchdog sites, weather sites) associated with a given Risk Category (e.g., Economic, Environmental, Geo-Political, Legal/Compliance).

Additional icons may be Generated for Graphical Display to indicate late-breaking news (e.g., a newspaper icon for new sources added within a certain number of runs or other preconfigured amount of time such as within the last twenty-four hours) or more intense risk events (e.g., two standard deviations more than normal press coverage in a given time period indicated via a flame icon). In additional embodiments, a list of underlying content may be filtered to show a subset of sources. For example, negative news content may be identified by running a query comprising a selection of negative impact terms against a result set to pull out articles with those terms present:

>   accus! or acquit! or allegation or allege or alleged or arraign! or arrest! or bankrupt! or barred or bid rig! or breach! or brib! or charged or collud! or collus! or conspir! or controvers! or convict! or corrupt! or cosa nostra or crime or criminal or debar! or decept! or defraud! or derogatory or disciplin! or discriminat! or embezz! or evad! or evasion or extort! or felon! or fined or fired or fraud! or grand jury or guilty or harass! or illegal or indict! or investigat! or jail or kickback or kill! or kiting or larceny or launder! or lawsuit or litigat! or mafia or misappropriat! or misdemeanor or misrepresent! or negligen! or notorious or offense or organized crime or ousted or overstat! or parole or payoff or ponzi or pornography or price fix! or probe or prosecuted or racketeer! or revok! or sanction! or scam or scammed or scandal or scheme! or scheming or sentenc! or settle! or suit or suspend! or suspension or swindl! or terminate or terminated or terrorism or terrorist or testif! or testim! or verdict or violat!

One of skill in the art will appreciate the possible modifications to such a query including performance of an inverse positive filtering. Once a document is accessed (e.g., a user viewing the cite list clicks on a link), a user may choose to save, print, or share the specified document in a variety of formats (e.g., txt, pdf, rft, HTML, etc.)

Figure 3A:
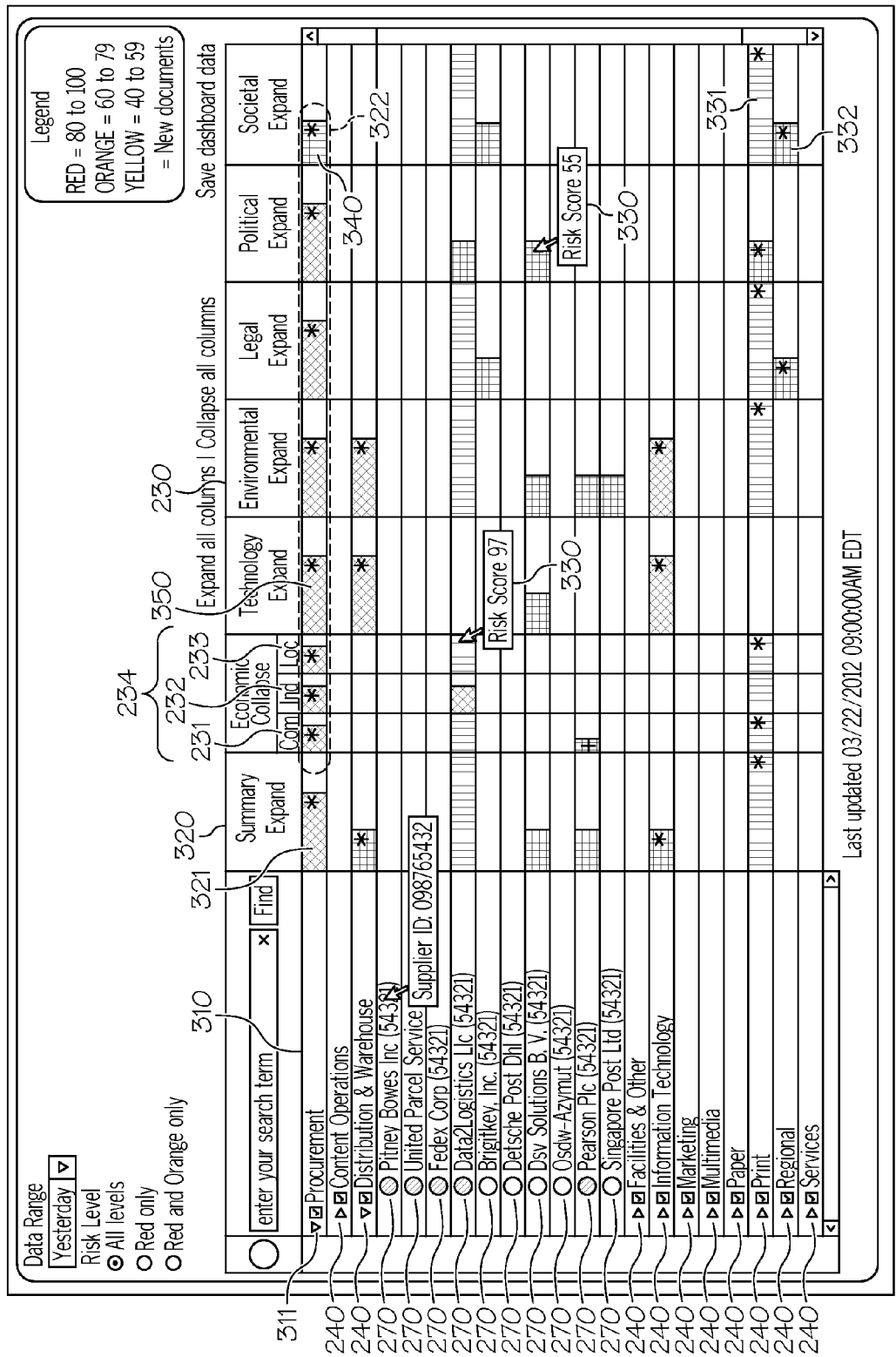
FIG. 3A represents another dashboard GUI Generated for Graphical Display on a visual sub-system comprising a Procurement Risk Grid with accumulated and expanded views.

Referring to FIG. 3A, an embodiment Generates for Graphical Display another variation of a dashboard (300) that may be expanded or collapsed to display varying levels of data. In an embodiment, a first column (310) provides a set of Supplier Categories (311) that may be expanded into a taxonomy of more finite Supplier Categories (240) or even down to the level of individual Suppliers (270). An embodiment Calculates and Generates for Graphical Display a summary view (320) of the Risk Score across all Risk Categories (230) for a given Supplier (270) or Supplier Category (240 or 311). A risk level filter may be used to tailor results to a specific set of Risk Scores. An additional toggle (e.g. a bubble positioned by or near a given Supplier, 270) may permit the user to add or delete specific Suppliers from an alert list.

A Risk Score (330) may be indicated through a variety of one or more mechanisms including, but not limited to, color-coding, shading or numeric risk level. For instance, a color-coded bar may be displayed or a numeric score may be provided through a pop-up icon/window (330) activated by hovering over the color-coded/shaded bar (340, 350). Risk Scores across a set of Risk Categories (230) may be Calculated and Generated for Graphical Display. Finally, a Risk Category Column may be expanded (individually or in groups) to Calculate and Generate for Graphical Display a Risk Score (330) associated with a set of Risk Dimensions (231-233, 234) within a Risk Category (230).

Referring again to an embodiment represented by FIG. 3A, a parent Supplier Category entitled "Procurement" (311) displays a (medium-high) Risk Score in its summary column (321). The Summary Column (321) may be expanded to Calculate and Generate for Graphical Display an expanded summary column (322) for each Risk Category (230). Expanding the Supplier Category column Generates for Graphical Display the children Suppliers (270) and/or Supplier Categories (240). Risk Scores (330, 331, etc.) for each child are Calculated and Generated for Graphical Display for the Summary and Risk Category columns. A user may perceive that new (unread or not previously accessed) underlying content sources are available for each Risk Score based on an iconic indicator (332) included in a Risk Score cell (e.g., an asterisk within the shaded/colored bar).

Referring to FIG. 3A, a Risk Category column may be expanded to Calculate and Generate for Graphical Display a set of Risk Scores for a set of Risk Dimensions (e.g., Company (231)/Industry (232)/Location (233)) within that Risk Category. In an embodiment, if a given Risk Category (230) (economic, technological, etc.) is collapsed, then the Risk Score (330, 331) may represent the highest score from each of the three Risk Dimensions (collectively, 234) displayed. Thus, in this embodiment, the collapsed Risk Category bar will be red if the company is orange, industry is red and location is green. It can be appreciated that other representation schemes (e.g. averaging the Risk Dimension scores to provide the Risk Category color) may be possible.

Figure 3C:
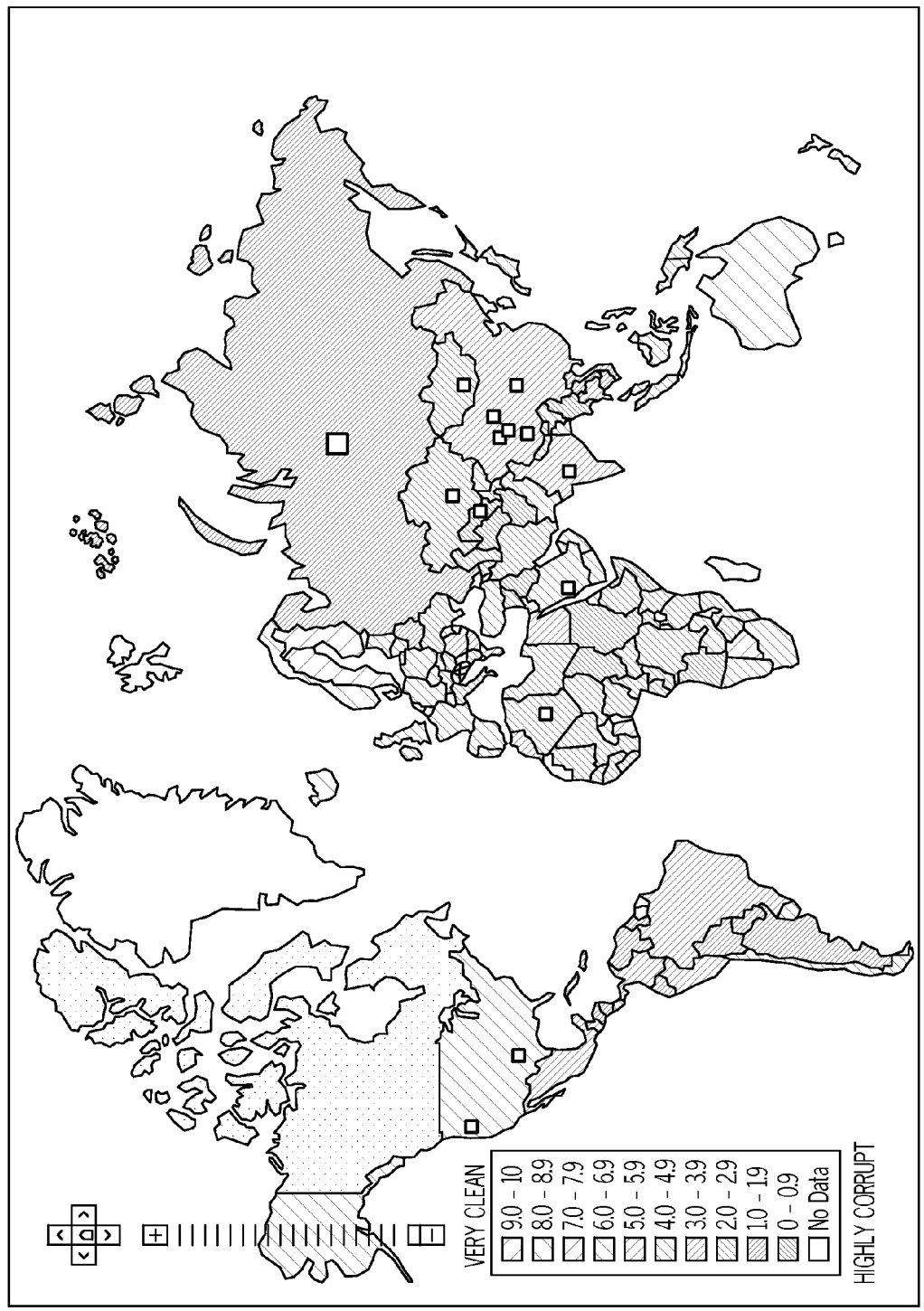
FIG. 3C represents of a GUI Generated for Graphical Display on a visual sub-system comprising a heat map.
Figure 3D:
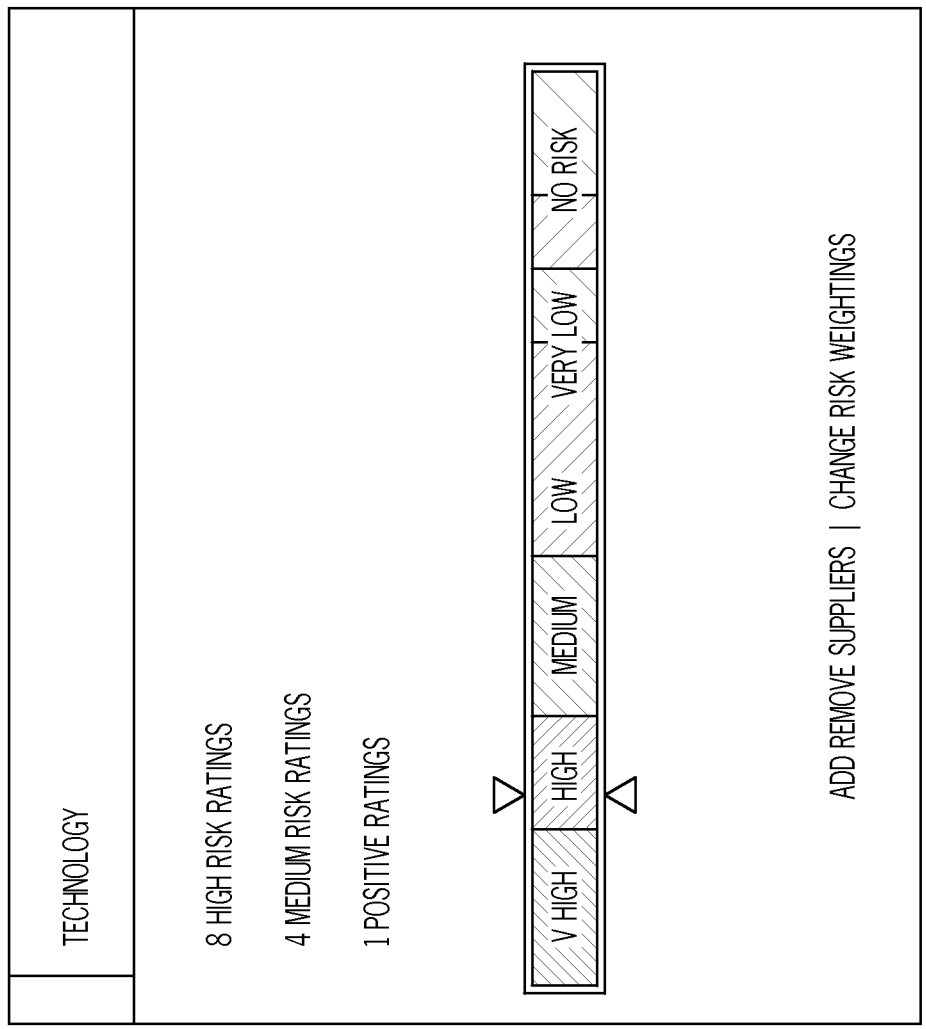
FIG. 3D represents of a GUI Generated for Graphical Display on a visual sub-system comprising a risk panel.

Referring to FIGS. 3B(1-4)-D, alternative embodiments may Calculate and Generate for Graphical Display Risk Scores output other than a risk grid. FIGS. 3B(1-4) represent an embodiment which Calculates and Generates for Graphical Display risk over a period of time for a Supplier Category (ies)/Supplier(s)/Risk Category(ies)/etc. in the form of various graphs. FIG. 3C represents an embodiment which Calculates and Graphical Generates a Risk Score in the form of a color-coded heat map where the Risk Score is aligned with a Location associated with a given risk. FIG. 3D represents an embodiment which Calculates and Generates for Graphical Displays a Risk Score summary for a given category such as a Supplier Category or a Risk Category (e.g., Technology although panels may be Generated for Graphical Display for other categories) in the form of a summary panel.

Embodiments of the system may provide alerts via a variety of communication mechanisms including, but not limited to email and text messages.

Setup—Loading Content

Referring to FIG. 4, an administrative GUI (400) is generated for Graphical Display to allow a user to enter or browse for a formatted file of Supplier information to upload into the system, for example, a .CSV file (410). In other embodiments, a single Supplier may be entered at a time through a web form. Once the file is uploaded, a user will see an accumulated set of Suppliers. An "Include Location" check box (415) for each Supplier may be checked. This allows a user to include location information in the disambiguation process. After the upload is completed, the data can be disambiguated. The system may also be set up to include location information by default and allow the user to exclude as desired.

Setup—Diambiguation (420)

Referring to FIG. 5A, an embodiment of the system provides an administrative GUI (400) to allow a user to resolve and/or validate Supplier name(s) and/or industry(ies) and/or location(s). An embodiment looks for an exact match (510) in a corporate database which may be provided through a third party via a request through an application programming interface (API—e.g., LexisNexis Dossier Suite or another third-party supplier platform with similar functionality). In this embodiment, if a macro event, such as geo-political unrest or natural disaster occurs in a particular region, the system immediately identifies which Suppliers are impacted.

An embodiment may then request confirmation from the user. Referring to FIG. 5B, if multiple matches are found (matches may be exact or similar), a user may select the one of interest (520) via a second interactive GUI (540) Generated for Graphical Display. If no matches are found, then the system may prompt the user for different information (530). An indication may be provided if an entry has been successfully disambiguated and validated. Validation requests may be color-coded. An embodiment of the system may provide information via a dashboard including a color-coding scheme representing the current state of disambiguation/validation and pop-ups to allow selection of alternative Supplier/Industry/Location. Hover functionality may provide a pop-up of Company code, Industry code and/or Location code. A user may customize the disambiguation process (420) to focus on only a subset of Supplier/Industry/Location input. Omitting a tag is also possible and may result in a broader net for capturing data or be irrelevant (e.g., for a service-based company with multiple locations in the manpower category). For instance, if the Location tag is omitted, the user may receive data for all locations of a given Supplier as opposed to its operations in a specific geographic location (e.g., city, state, region, country, etc.). In an alternative embodiment, a system can also be configured to track a subset of a given Supplier's locations or industries.

Figure 5C:
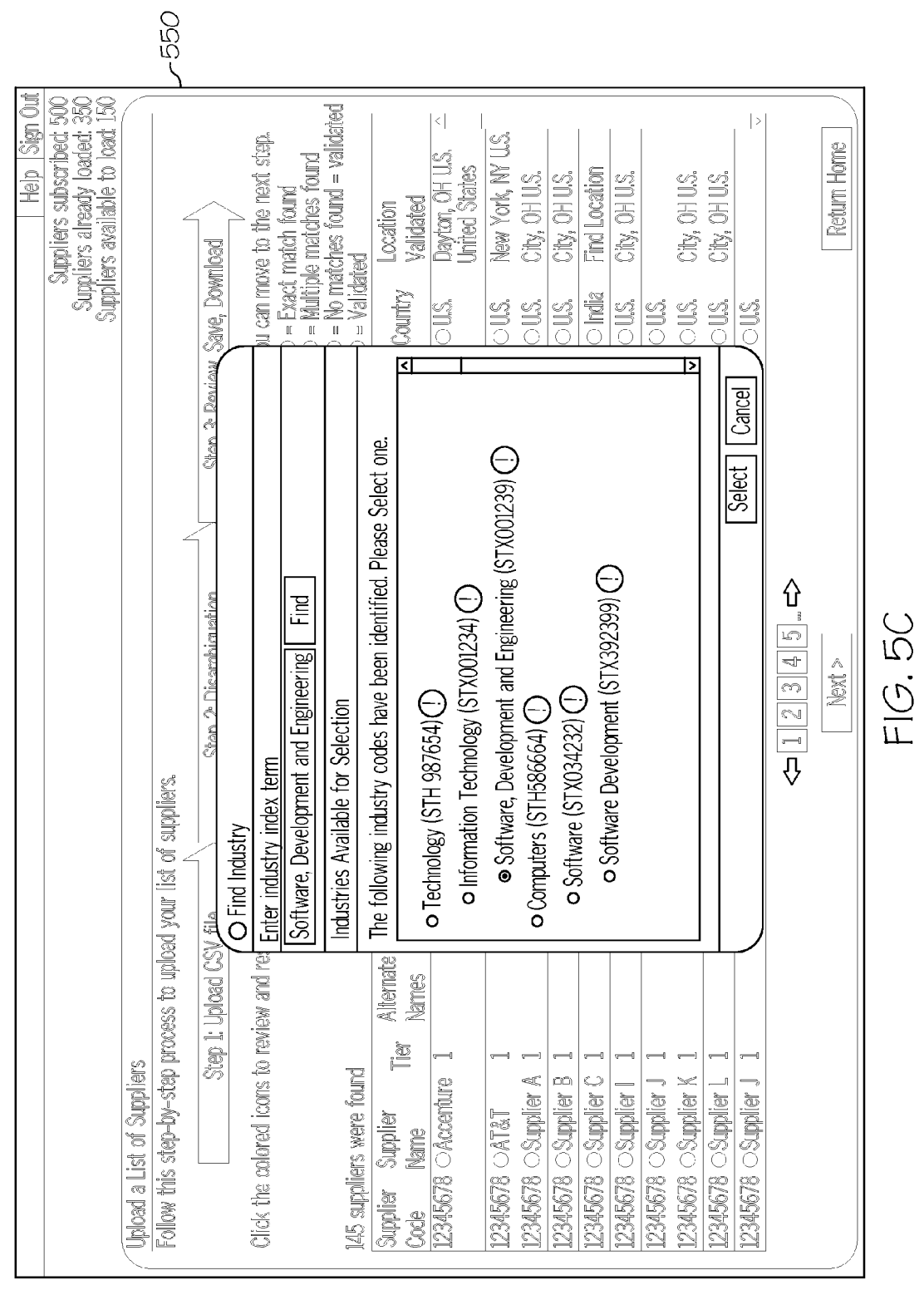

Referring to FIG. 5C, an embodiment Generates for Graphical Display another administrative GUI (550) to allow for the disambiguation of a particular industry. If a user clicks on the information icon, a pop-up with a more detailed explanation of that industry may be provided. Location tagging may be similarly disambiguated.

Setup—Tagging

Referring to FIG. 6, an embodiment of the setup functionality (600) is provided. Once a Supplier(s) has been disambiguated and validated, there may be provided means for viewing and editing the list of Suppliers (or a group thereof) as well as customizing a set of Tags to be used as Computer Machine Input by an embodiment of the system to determine how Suppliers may be categorized or rolled up. For instance, General Motors could have a group of suppliers titled Brake Suppliers, which rolls up to Auto Parts, which rolls up to Chevrolet, etc.

In an embodiment, Supplier data may be tagged against a set of indexing terms as it is loaded (e.g., Lexis Nexis Smart Indexing) for Company, Location, and Industry. Data may also be matched against a database of country risk data comprising country risk scores in areas such as bribery, corruption, geopolitical unrest, natural disasters, etc. Data may be used to generate heat maps (FIG. 3C) to indicate risks based upon Supplier location. Such maps may include multiple layers, including static information (e.g., location on a fault line or location of an area with a high risk-index for child labor). It may also be used to Calculate the base Risk Score for the location scores in the dashboard matrix.

Referring to FIG. 7, the Tags associated with a Supplier may be hierarchically arranged (720) in a tree structure and weighted (730) using a GUI (700) generated by an embodiment of the system. Referring to FIG. 8, another generated GUI (800) allows Risk Weights (810) to be set for a given Supplier. In an embodiment, weights may be set in the range of 1-5 with each point being worth 20% of the total (it will be appreciated that many weighting configurations may be employed). Weights may be used to determine the sensitivity to give to each supplier or Supplier Category, based upon its relative importance to a company. Weightings may help determine which content to Surface as well as to Calculate one or more Risk Scores. One or more Tags may be selected/deleted/re-assigned for a given Supplier by selecting the checkbox associated with a given Tag. This lets the user control how embodiments of the system Generate for Graphical Display a given dashboard.

Referring to FIG. 9, a given Supplier may be defined as Computer Machine Input via a data structure including, but not limited to, the following attributes or a subset thereof, for the purpose of associating content and Calculating a variety of Risk Scores:

Supplier ID (910)
Supplier Name (official name for this Supplier) (915)
Alternative Names (if applicable, e.g., Big Blue for IBM) (920)
Company Identifying Information (including but not limited to HQ location, ticker, D&B number, website URL, etc.) (925) (e.g., using LexisNexis Corporate Affiliations Data)
Ultimate Corporate Parent (even if there are multiple tiers between a given entity and its ultimate parent) (930)
Intermediate Parents (a user may configure their query to include ultimate or intermediate parents in the risk calculation) (935)
Taxonomy Derived Tags (950) may be chosen from one or more taxonomies associated with the content being mined (e.g., 3500 tags in LexisNexis SmartIndexing or 100 tags in NAICS):
Supplier Category (951) may be defined in groupings of various sub-categories (e.g., travel services, transportation) as well as by level of importance (for instance, if office supplies is a lower category than the HR platform). Multiple layers of Supplier Categories may be nested (e.g., Supplier Category, Department, Division, etc.).
Product Description (952)
Manufacturing Facilities or Key Locations (953, 954, 955) may be used to match Suppliers to the location risks they may incur—in an embodiment, all locations that are utilized in the supply chain may be included to identify any disruptions along the line.
Supplier Tier (a designation of the importance of a given Supplier) (940). Tier weighting may be used to define how important a given Supplier is (e.g., Tier 1 may be used to indicate that a product cannot be made without that particular Supplier). Tier 1 Suppliers may have a unique offering or they may have customized their offering particularly to meet a need. If Tier 1 Suppliers had a disruption in their business operations, their upstream client would undergo considerable costs, efforts and possibility inability to produce additional automobiles until the break in the supply chain is fixed. Tier 2 Suppliers may be important, but not mission critical and Tier 3 Suppliers may be the third tier of important Suppliers. Any additional Suppliers may consist of Suppliers of easily replaceable products like office supplies or travel agencies.

Any of these attributes may be coded as a Supplier Category Tag.

Figure 10:
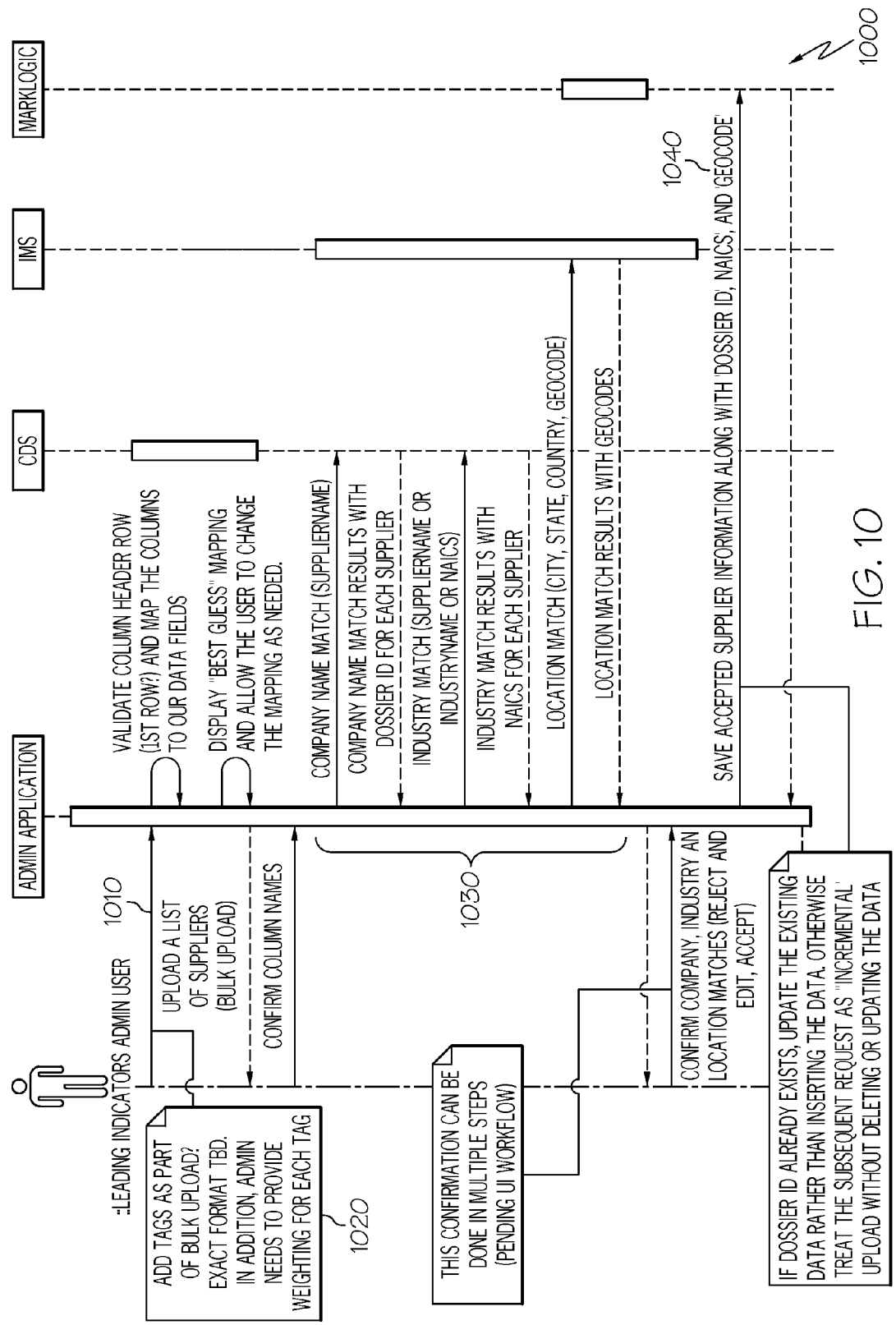
FIG. 10 represents a process flow for uploading and tagging a set of Suppliers.

FIG. 10 provides a global overview of the tagging process (1000) across a set of administrative modules such as Common Dossier Service (CDS) and Indexing Metadata Service (IMS) and an operational database (e.g., MarkLogic or HPCC—high performance computing cluster). An Administrative User may upload a list of Supplies (1010) (e.g., through a bulk upload). Tags may be added as part of the bulk upload along with weighting for each Tag (1020). In the CDS component, validation of the company name may be performed by checking Dossier IDs and other third party databases (e.g., NAICS or LexisNexis Industry Code) (1030).

Validation of industry and location may occur in an IMS component although a system could be configured to combine/split validation into a single or alternative modules. GeoCodes may also be established for location matches by interacting with the IMS component (1040). Once the Supplier has been validated, the core information (dossier ID, NAICS industry code, and GeoCode) may be stored for comparison against content stored in the operational database. This stored information may form a pre-disambiguated supplier list that can be used to more quickly disambiguate future entries. If no matches are found, admin user can supply additional terms for us to match the documents for that supplier.

Searching

An embodiment of the system may access a corpus of content comprising an aggregation of sources (or subset thereof) including, but not limited to, news, legal analyses, and updates, business editorials, public records (e.g., PEP and OFAC) and other sources from around the world. A third party provider may provide the corpus of content (e.g., LexisNexis or a third-party provider such as the New York Times) or the corpus may be available through other means.

In an embodiment, content sources in the corpus may be analyzed and tagged according to a predefined taxonomy (e.g., LexisNexis SmartIndexing) using a rules-based automated system that may classify documents for subject, company, industry, people, location or other classification. The tagging may be geared toward a specific slant by choosing a subset of Tags available in a given taxonomy (e.g., Tags associated with risk analysis). Tagging may be performed as a separate step on a given corpus or executed contemporaneously as new content is received.

The chosen taxonomy methodology may be supplemented by extraction and analytics tools for the evaluation of big data (whether structured or unstructured) (e.g., NetOwl), to recognize events and associate them with the Suppliers who may potentially be impacted. An embodiment searches the content corpus and/or content Tags (which may be stored on a database, extracted from a news feed, or provided through some other content delivery mechanism) for Supplier Tags (e.g., a Supplier's unique information like 'CCT' code (for company), 'Dossier ID' (for company), 'NAILS' (for industry), and 'GeoCode' (for location)).

In an embodiment, if a Supplier's company name, industry and/or location (or expected variations thereof) are found in a content source with a Risk Event, a match may be made, and the content may be scored and surfaced to the dashboard.

Scoring

One of skill in the art will appreciate that there are many ways to load content into an operational database server (e.g., MarkLogic 5, HP) including using MarkLogic XQuery codes, RecordLoader, WebDAV, Information Studio (or Info API), REST, XCC and others. It may also be desirable to create a custom loader to pre-process content prior to utilizing a commercial or open source record loader. Preferably, the mechanisms used to load content will allow the receipt of either large XML files or zip files with many XML files by breaking them up into small documents; loading XML directly from a zip archive; applying transformation to change the format of the documents; resuming interrupted loads; and running multiple parallel loads. Various tools known to those of skill in the art are available for these purposes including, but not limited to, java utilities and/or lightweight java processes (e.g., BatchProcessor or Total Patent's RecordLoader) and MarkLogic's Information Studio (i.e., Info API).

In an embodiment, once a match occurs, the corresponding Risk Event may be scored. An embodiment may Calculate a Risk Score using Tag Weights and/or Risk Category Weights. The result set Generated for Graphical Display may be more finely tuned by slicing the data along a particular Location, Industry, Supplier and/or Risk Category.

A user may weight a defined Risk Category (e.g., reputational risk is more important than environmental risk so reputational risk receives a higher weight). Risk Categories may default to equal weighting in generating a summary score (e.g., an average across the columns) but the weights may be configured to produce a specialized score. In this way, a given Risk Category may be of less importance to the overall score or even eliminated entirely (e.g, by setting the weight to "0" or some other way nulling that factor). Risk Scores may affect the order of documents presented in a dashboard.

A Base Score based on a document's sentiment may be calculated to determine overall impact (negative or positive) of an information source to the Risk Score. More detailed taxonomies may be created to classify documents on a more granular level (e.g., paragraph or sentence) especially when multiple companies/industries/locations are named in a specific document. A third party product such as LexisNexis Analytical Solution may be used for this purpose.

Spend Classification Weighting

In an embodiment, a user may define a highest tier (e.g., Supplier) as well as specific spend categories (e.g., IT spend) and even spend sub-categories (e.g., desktop hardware).

Once a user defines their spend categories they may then assign every Supplier to a spend category or sub-category. A user may then weight each of these categories and sub-categories:

| Top Tier | Category | Weighting | Cumulative Weighting |
| --- | --- | --- | --- |
| Global Procurement | IT | 30% | 30% |
|  | Services | 25% | 55% |
|  | Marketing | 35% | 90% |
|  | Travel | 10% | 100% |

These adjustments allow a customer to define the relative importance of one area of spend or another into the tool.

Suppliers may be given a weighting of 1 to 3 where 1 is the highest (most important) weighting. These weightings may also be referred to as Suppliers Tiers (or "Tiers"). These weightings may be embedded in a Calculation to adjust a base score. For example, the following adjustments might be effect of a given tier:

| Tier 1 | Base Score * 125% |
| --- | --- |
| Tier 2 | Base Score * 100% |
| Tier 3 | Base Score * 80% |

Subcategory Score

Score roll-up may include a leveling Calculation since there may be more Suppliers in a given Supplier Category. For example, because there are more Suppliers in Subcategory 2, Subcategory 2 appears to have the most risk when in fact both Suppliers in Subcategory 1 have a much more higher Base Score.

| Supplier | Subcategory 1 | Subcategory 2 |
| --- | --- | --- |
| A | 95 |  |
| B | 97 |  |
| C |  | 23 |

-continued

| Supplier | Subcategory 1 | Subcategory 2 |
|---|---|---|
| D | | 45 |
| E | | 51 |
| F | | 4 |
| G | | 37 |
| H | | 61 |
| Total Category Scores | 92 | 261 |

In an embodiment, an adjustment may be Calculated against the Base Score for a given Supplier that is outside of two standard deviations from the Median (e.g., standard deviation adjustment of 40% that is either added or subtracted from the Base Score) to compensate when a given Supplier has a much higher Base Score than its peer Suppliers in the subcategory. Referring to the following table:

| Supplier | Base Score | Adjustment |
|---|---|---|
| A | 23 | 1 |
| B | 16 | 1 |
| C | 69 | 1 |
| D | 18 | 1 |
| E | 27 | 1 |
| F | 85 | 1.4 |

Based on this set of Base scores, the median is 25 and the standard deviation is 27.03 (these were Calculated using the delivered median and standard deviation formulas in Excel although other methodologies may be available). Therefore, the standard deviation range is 0 to 79.06. (25−(27.03*2)) (negative ranges may be normalized to a score of 0) to 79.06 (25+(27.03*2). Because Supplier F is the only Supplier outside of this range and they are outside the range on the upper end, they have a Median Adjustment of +40%.

Adjusted Base Score

Once a Supplier's Tier Adjustment and Median Adjustment are calculated, the adjusted Base Score may be calculated. In an embodiment, the Risk Category Weighting and Supplier Tier adjustment may be Calculated according to the following formula at the Supplier level for each Risk Category:

Base Score*Supplier Tier Adjustment*Median Adjustment*Risk Category Weighting=Adjusted Base Score.

The average of all of these scores for a given category may be calculated to create the Category Summary Score.

Total Supplier Score

The Total Supplier Score may be the sum of all Adjusted Base Scores for each Risk Category for a given Supplier. For example:

Total Supplier Score=(Adjusted Base Score for Social Responsibility)+(Adjusted Base Score for Environmental)+(Adjusted Base Score for Geo-political)+(Adjusted Base Score for Economic)+(Adjusted Base Score for Operations/Technology).

Total Subcategory Score

The Total Subcategory Score may be the sum of all Averaged Adjusted Base Scores for each sub-category multiplied by their Spend Classification Weighting for a given category. For example:

| Supplier | Total SupplierScore | |
|---|---|---|
| A | 41.06 | |
| B | 33.35 | |
| C | 34.00 | |
| D | 39.68 | |
| E | 20.08 | |
| F | 84.60 | |
| Average | 42.13 | |
| Spend Classification | | 10% |
| Total Subcategory Score | | 4.21 |

Total Category Score may be the sum of all Total Subcategory Scores.

Total Score may be the sum of all Total Category Scores.

Totaling scores may be Calculated at both the Risk Category and Spend category level as well as for every Supplier and every Supplier by Risk Category.

In another embodiment, score-rollup may proceed according to an embodiment depicted in FIGS. 15A-B. Referring to F4 (e.g., Departmental Score), an average may be taken of cells F5 and F22-F25 (Categories A, B-E).

A Category Score may be Calculated by rolling up the (Maximum Score from all of its Subcategories) multiplied by (a factor comprising that Category's weight divided by the number of Categories available).

A Subcategory Score may be Calculated by rolling up the maximum score of all the Subcategories multiplied by two factors:

The weight given to the overall risk category (here, Social Responsibility at Weight 5) divided by the number of risk categories under consideration; and The ratio of that given subcategory over the total number of subcategories.

Tier 1 Average Content Score may be an average of the content scores for all Suppliers within a given tier. It may be adjusted by a factor of that tier's weight divided by the number of possible tiers.

Results from the various scoring methodologies/systems may then be used as Computer Machine Input to Generate Graphical Displays which communicate that information in an efficient manner.

Architecture

In an embodiment, the system may be architected as a stand-alone system. In another embodiment, it may be installed directly into a workflow as a plug-in.

Figure 12:
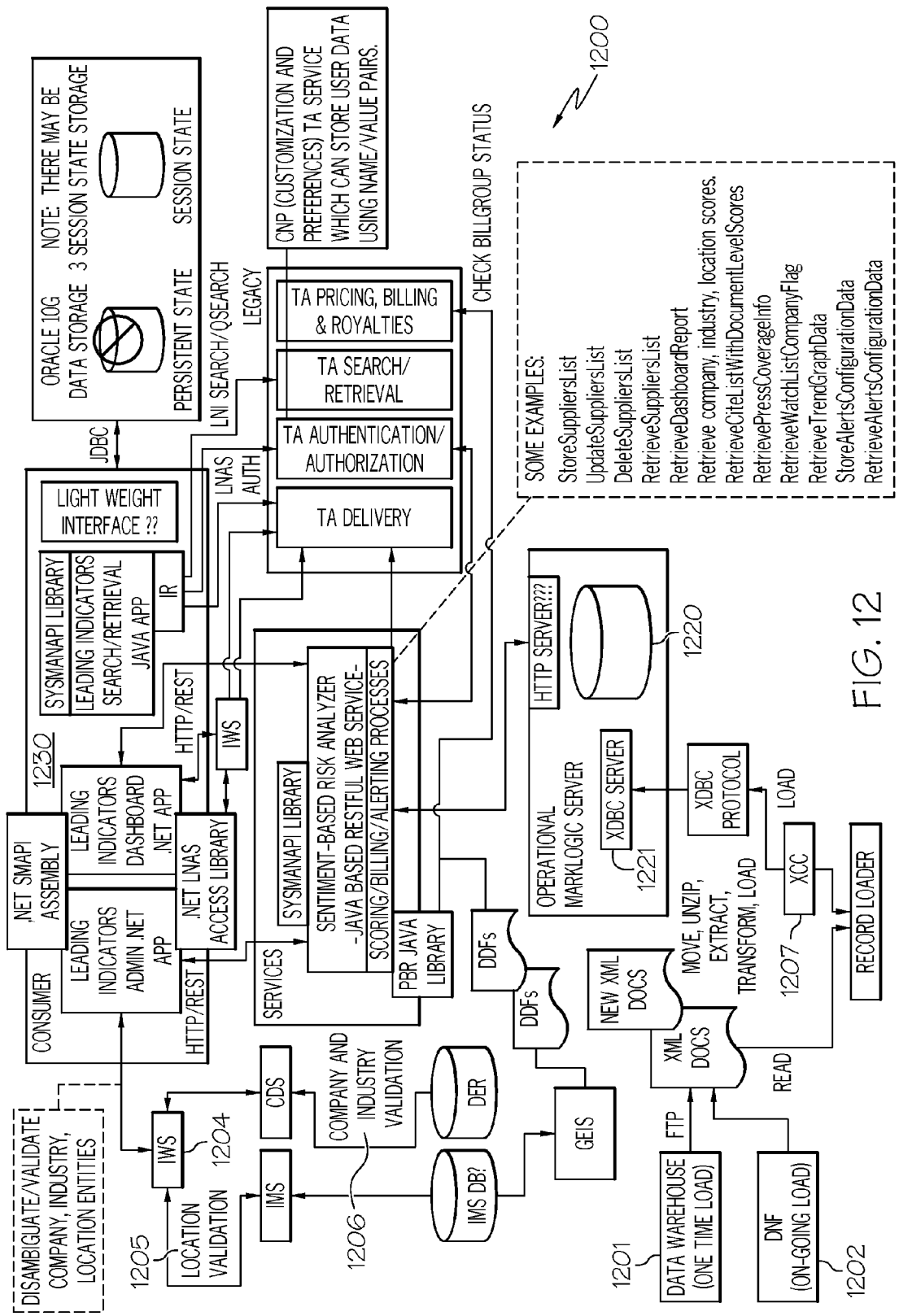
FIG. 12 represents an architecture for an embodiment of the system.

Referring to an embodiment depicted in FIG. 12 (1200), an operational database may receive documents from a variety of sources (e.g., Data Warehouse—1201, On-going Loader—1202, etc.). A front-end Sentiment-Based Risk Analyzer (1210) (SBRA) (e.g., RESTful web service) may perform search and retrieval of scored data/rollup. A backend SBRA (e.g., runtime JAVA component) may perform scoring by applying an algorithm to calculate a base score for each document. Additional modules for billing and alerting (1212) may be provided. A component (1230) provides the administrative module, the dashboard module, and the search/retrieval module for rolling/scoring data requested from the Analyzer component (1210).

A .NET App may communicate with the IMS and CDS via IWS (1204) for Location, Company and Industry validation (1205-1206). An embodiment may provide communication means between a Sentiment Based Risk Analyzer (1210) and a backend database (e.g., MarkLogic) (1220). Such communication may take place over the Internet utilizing an HTTP server (1221). Embodiments may be coded in Java using an MVC (Model, View and Controller) hierarchy to abstract the complexities of the different parts of application. This application may be run on a .NET platform/framework. In an embodiment, the .NET application may run on a different system rather than an instance of MarkLogic server. It may utilize the MarkLogic built-in 'XCC' (Xml Contentbase Connector) (1207) client Java libraries to communicate a database via a MarkLogic XDBC server (1221). Embodiments may take advantage of built-in logic such as connection pooling to automatically create and release connections to an operational server (e.g. MarkLogic server) (1220), automatically pool connections, and handle multiple requests efficiently. .NET may be a thin layer and it may submit XQuery requests for inserting, selecting, updating and deleting data against a database. SMAPI related error logging and instrumentation may be incorporated.

Index terms may be identified to Surface risk events. Risks may be rolled into Risk Categories, Risk Subcategories and Suppliers, with scores providing Computer Machine Input to Generate for Graphical Display which categories of Suppliers may be at risk. Other content such as OFAC, PEP and various watchlists may also be monitored and surfaced. Embodiments may also watch for commodity and raw material pricing/futures and follow a company's stock trends using an integrated historical quotes offering (e.g., LN SunGard). Users could click to expand a category or subcategory of interest and procurement teams could view the dashboard from within another system (e.g., Ariba).

Figure 11:
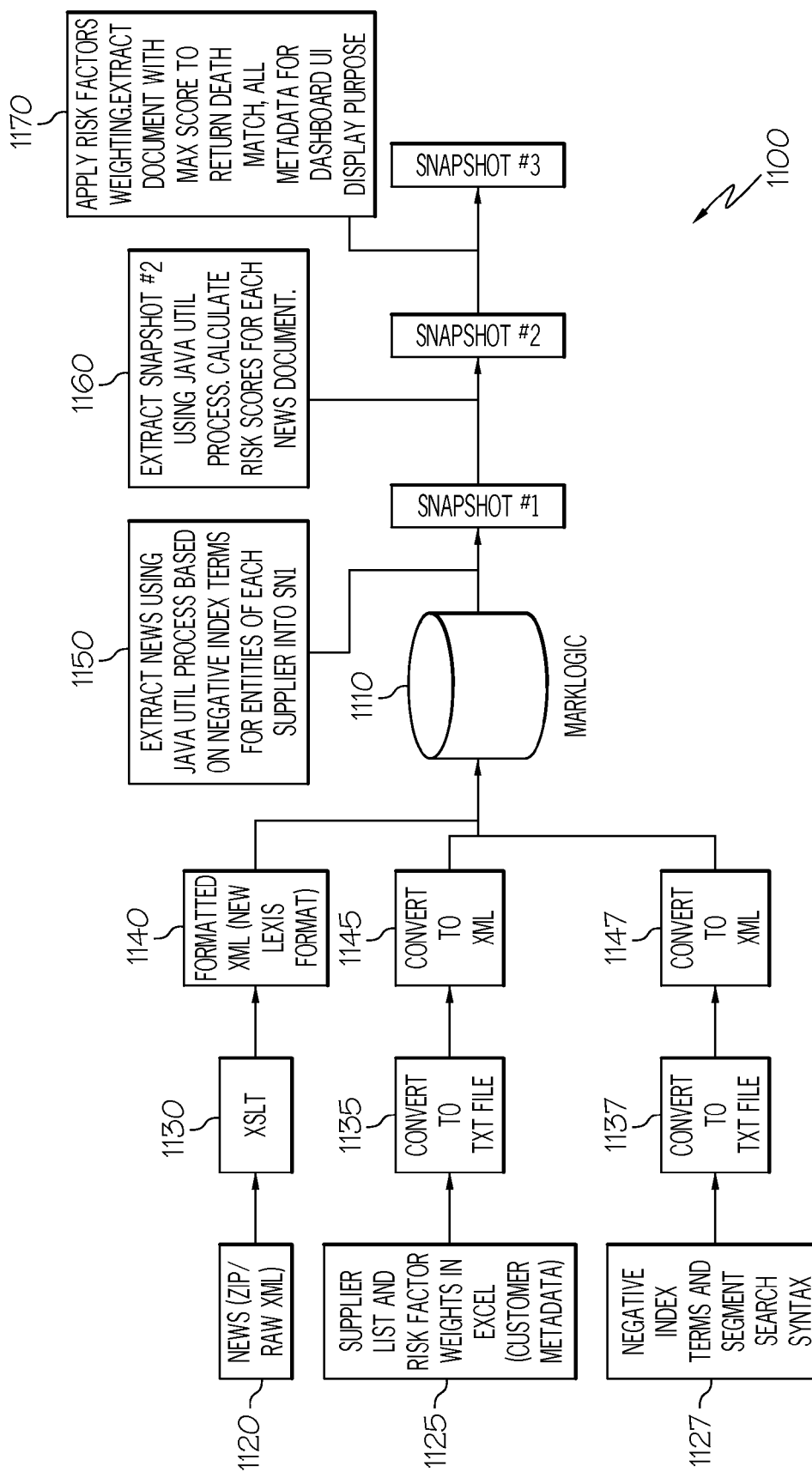
FIG. 11 represents a high-level overview of input-processing-output by an embodiment of the system.

Referring to an embodiment depicted in FIG. 11 (1100), preprocessing may include developing input for the operational database (1110) by converting feeds (e.g., zip files, raw XML) (1120) via style sheets (1130) to produce a uniformly formatted XML (1140), converting Supplier lists and Risk Category Weights (1125) from a spreadsheet or other input format to a text file (1135) and then to XML (1145), and converting an index of negative terms (1127) and segment search syntax into text (1137) and then XML (1147). News extracted using JAVA utilities processes based on negative index terms (1150) for entities of each Supplier may be loaded into a first snapshot. Using JAVA utilities processes (1160), Risk Scores may be Calculated for each document into a second snapshot. Finally, applying Risk Category weighting as well as extracting all documents with automatic roll-up matches (1170), the embodiment may Generate for Graphical Display a third snapshot comprising the a dashboard view of the final scores.

Billing Mechanism

Embodiments of the system may generate billing events to calculate royalties/fees associated with the use of content to calculate Risk Scores or to provide views of the content. Royalty records may be generated by weighting the type of access differently (e.g., content used in the generation of a Risk Score Calculated by the system versus content actually viewed versus content used to generate an alert based on a user's configuration).

Zeitgeist Tracking Mechanism

Another embodiment of the invention may Calculate and Generate for Graphical Display a level of awareness for a subject within both a geographic region and within a time range. An awareness index may be developed by assessing article volume in a specific region on a defined subject by comparing two or more time frames (the time period for which one wishes to assess awareness against a baseline timeframe, e.g., 18 months). Computer Machine Input may include raw or normalized volumetric data captured into one or more spreadsheets (e.g., Excel), as depicted in FIG. 17, which outlines hits against the number of publications within a geographic subset that were searched over the past year. In an embodiment, content sources within a corpus may already be tagged with geographic indicators of the source of the data (e.g., the region of publication). Free-text search on a subject that is not already included in the tagged corpus may be searched using semantic equivalents via a thesaurus function. In an alternative embodiment, the system may Generate for Graphical Display an administrative interface to allow a user to weight the relevance of that term in a given document based on term frequency, weight, and location. If a user sets a higher relevance score, a more discrete return set may result. For example, an index can be based on all articles with a >50% relevance match for a given subject, or could be refined to only identify articles with a >70 or >90% relevance score, if the user was interested in a more focused index.

In an embodiment, the system may present pre-set geographic source compilations or allow a user to define a narrower subset of sources via an interactive GUI Generated for Graphical Display.

Figure 13:
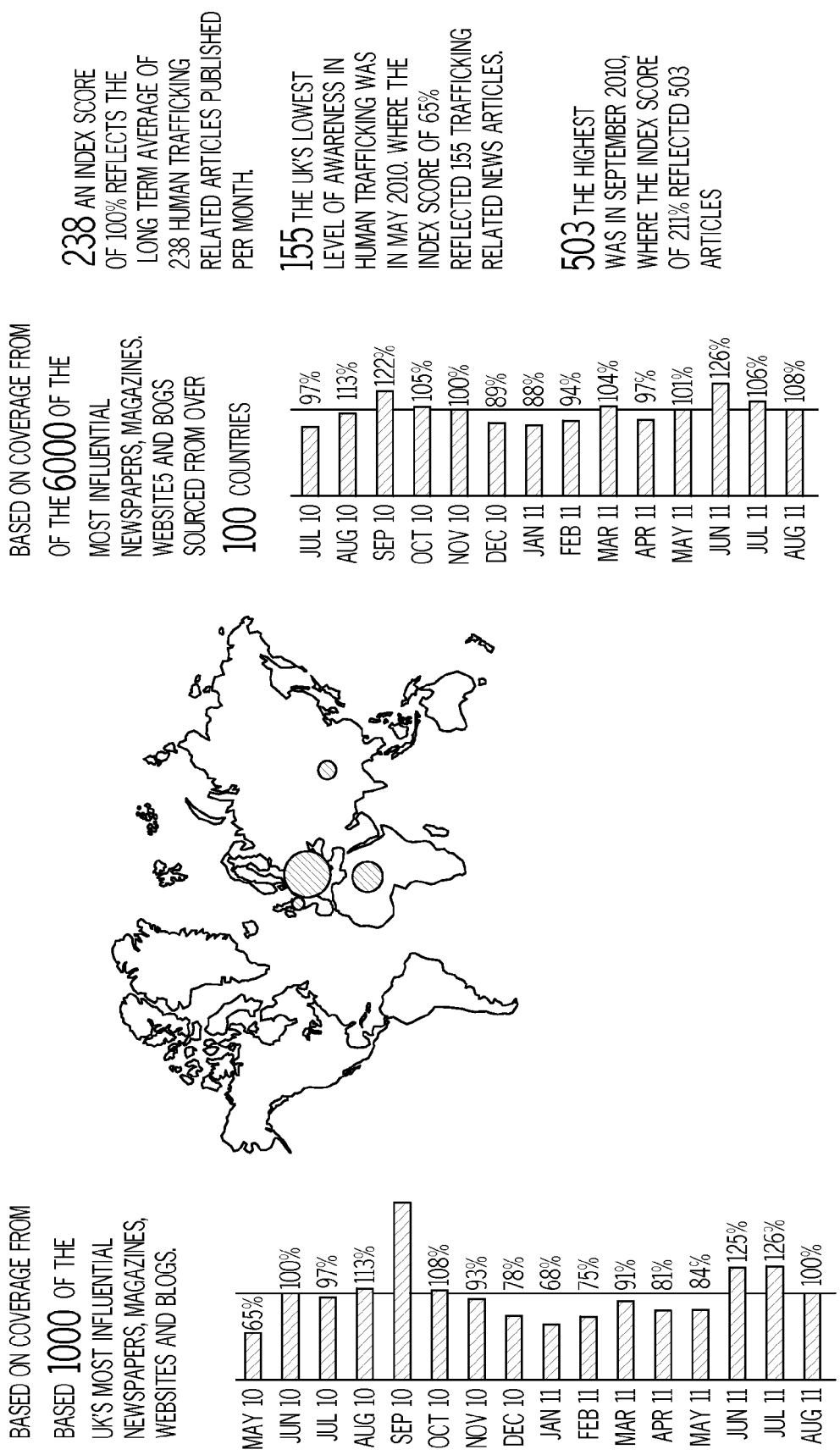
FIG. 13-14 represent a series of outputs (bar graphs, heat maps, bar charts, textual summaries) Generated for Graphical Display on a visual subsystem comprising a comparison of awareness of a subject in a set of geographical regions for each month, over a period of several months, against a baseline.
Figure 14:
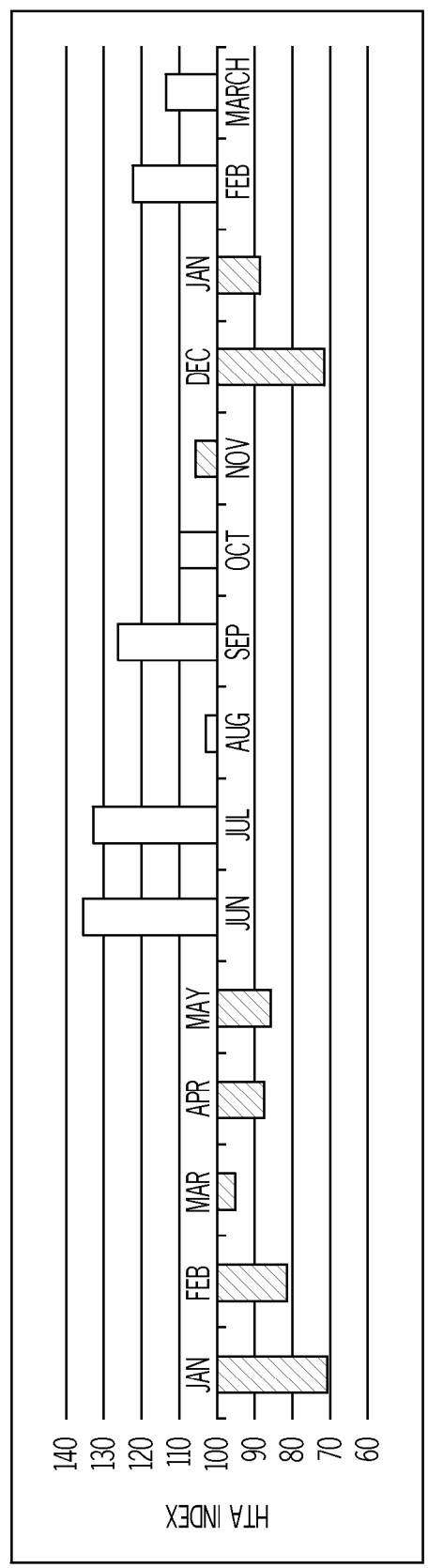

Referring to FIGS. 13-14, a wide range of outputs (bar graphs, heat maps, bar charts, textual summaries) may be Generated for Graphical Display on a visual subsystem. Embodiments may Generate for Graphical Display a comparison of awareness of a subject in a set of geographical regions for each month, over a period of several months, against a baseline which represents an average of the entire time period. Embodiments may Generate for Graphical Display a timeline of awareness.

Referring to the table in FIG. 16, a Calculation may be performed to determine the variance, on a monthly basis, against a baseline score. These monthly volumes may be tracked to identify broad trends in awareness levels, which can be influenced high profile cases, events or campaigns. When the Index falls below the baseline average score then awareness of a topic within a geographic areas can be deemed to be below trend and when it rises above the baseline average score then awareness of a topic can be said to be above trend. Accompanying graphics may further highlight such trends (e.g., arrow position).

Further data may be accessed by clicking on an interactive icon which will Generate for Graphical Display an interactive summary or set of links (270), for a set of Surfaced content sources for a given Subject/Geographic Region. A link within the set of links may be clicked through to Generate for Graphical Display a content window associated with that headline. This enables the user to read the underlying articles contributing to an index score within the native application rather than having to visit multiple external websites where links may have expired or be blocked by firewalls or other access control mechanisms.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. The diagrams and representations of output Generated for Graphical Display are all provided for exemplary purposes. The illustrative diagrams and charts may depict process steps or blocks that may represent modules, segments, or portions of code that include one or more executable instructions for implementing specific logical functions or steps in the process upon a Computer Machine. In various embodiments, described processing steps may be performed in varying order, serially or in parallel. Alternative implementations are possible and may be made by simple design choice or based on, for example, considerations of function, purpose, conformance to standard, legacy structure, user interface design, and the like. Additionally, execution of some functionality, which would be considered within the ambit of one skilled in the art, may be omitted without departing from embodiments disclosed herein.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory. These capabilities may be performed in the current manner or in a distributed manner and on, or via, any device able to provide and/or receive information. Still further, although depicted in a particular manner, a greater or lesser number of modules and connections can be utilized with the present disclosure in order to implement or perform the various embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A system configured to perform analytics to facilitate issue awareness comprising:
    at least one non-transitory, computer-readable storage medium on which a database management system is stored and configured to access an index of metadata corresponding to a set of content items related to at least one particular issue in a corpora of electronically stored content;
    at least one sub-system configured to generate at least one interactive graphical user interface (GUI) for display on a computer-based visual sub-system;
    at least one sub-system configured to receive a query request comprising at least one entity, the query request configured by a user in said interactive GUI, wherein:
        said query request includes a user-defined threshold;
        said at least one entity is associated with an entity profile comprising a set of tags, a supplier tier, a supplier tier weight, a supplier category, and a supplier category weight; and
        said set of tags in said entity profile are included in said query request;
    a computer machine configured to:
        receive said query request as computer machine input;
        search a set of metadata tags stored in said index for at least one term contained in said query request;
        identify a set of metadata tags which match said query request;
        identify at least one document, in said corpora, which is associated with said set of metadata tags;
        calculate a content score for each document identified in the previous step;
        when said content score exceeds said user-defined threshold:
            surface said document;
            calculate a summary score for a set of documents surfaced in the previous step based on the content scores associated with said documents, wherein said summary score averages said content scores for said set of surfaced documents for each of said at least one entity; and
            display a second interactive user interface to communicate said summary score wherein said second interactive user interface is configured to display each summary score in a grid and permit a user to click through said summary score to reveal a set of documents from which said summary score was derived;
            calculate a tier score by averaging said summary scores for all entities assigned to a given tier;
            calculate a weighted tier score for said given tier by applying said supplier tier weight; and
            calculate a supplier category score by selecting a maximum score associated with a supplier within a given supplier category and applying a supplier category weight.

2. A system configured to perform analytics to facilitate issue awareness as claimed in claim 1 wherein:
    said query request comprises at least one entity profile and at least one risk category and risk category weight;
    said summary score averages said content scores for said set of surfaced documents for each of said at least one entity profile in each of said at least one risk category; and
    said second interactive user interface displays each summary score in a grid juxtaposing a set of suppliers against a set of risk categories.

3. A system as claimed in claim 2 wherein said risk categories are chosen from the list consisting of environmental issues, economic issues, societal issues, political issues, technology issues, business-specific issues and legal issues.

4. A system as claimed in claim 3 wherein:
    said second interactive user interface is further configured to expand said set of risk categories into a set of risk dimensions comprising a company perspective, an industry perspective, and a location perspective; and
    said summary score for said company perspective is based on a subset of said surfaced documents comprising a match with at least one company name associated with said entity profile;
    said summary score for said industry perspective is based on a subset of said surfaced documents comprising a match with at least one industry tag associated with said entity profile; and
    said summary score for said location perspective is based on a subset of said surfaced documents comprising a match with at least one location tag associated with said entity profile.

5. A system as claimed in claim 4 further comprising an administrative subsystem configured to:
    display, on a computer-based visual sub-system, an interactive administrative GUI to allow a user to configure at least one entity profile further comprising a supplier and a set of tags associated with said supplier including a supplier tier, a supplier tier weight, a supplier category, and a supplier category weight; and receive and store said entity profile in a computer-readable storage medium.

6. A system configured to perform analytics to facilitate issue awareness as claimed in claim 1 wherein:

said query request comprises at least two time periods and at least one geographic designation;

said query request further includes a subject chosen from a set of subjects contained in said metadata index;

said summary score counts said set of surfaced documents for each of said at least two time periods;

said second interactive user interface graphically compares said summary score associated with each of said at least two time periods.

7. A system as claimed in claim 6 wherein said at least two time periods comprise a baseline time period and a second time period and said threshold comprises a minimum relevance level.

8. A system as claimed in claim 7 wherein said index of metadata comprises a set of geographic tags and wherein each content item in said corpora of electronically stored content is associated with a tag corresponding to said content item's region of publication.

9. A system as claimed in claim 8 wherein said second interactive user interface graphically displays said summary scores for each of said geographic designations.

10. A system as claimed in claim 9 said query request is further configured by providing a set of weights to use as computer machine input to determine if a document meets or exceeds said minimum relevance level wherein said set of weights are associated with said subject's location and frequency in said document.

11. A system configured to perform analytics to facilitate issue awareness comprising:

at least one non-transitory, computer-readable storage medium on which a database management system is stored and configured to access an index of metadata corresponding to a set of content items in a corpora of electronically stored content;

at least one sub-system configured to generate at least one interactive graphical user interface (GUI) for display on a computer-based visual sub-system;

at least one sub-system configured to receive a query request configured by a user in said interactive GUI, wherein said query request includes a user-defined threshold, at least one entity profile, and at least one risk category and risk category weight, and wherein said risk categories are chosen from the list consisting of environmental issues, economic issues, societal issues, political issues, technology issues, business-specific issues and legal issues;

a computer machine configured to:

receive said query request as computer machine input;

search a set of metadata tags stored in said index for at least one term contained in said query request;

identify a set of metadata tags which match said query request;

identify at least one document, in said corpora, which is associated with said set of metadata tags;

calculate a content score for each document identified in the previous step;

when said content score exceeds said user-defined threshold:

surface said document;

calculate a summary score for a set of documents surfaced in the previous step based on the content scores associated with said documents, wherein said summary score averages said content scores for said set of surfaced documents for each of said at least one entity profile in each of said at least one risk category; and display a second interactive user interface to communicate said summary score wherein said second interactive user interface is configured to:

display each summary score in a grid juxtaposing a set of suppliers against a set of risk categories;

permit a user to click through said summary score to reveal a set of documents from which said summary score was derived; and expand said set of risk categories into a set of risk dimensions comprising a company perspective, an industry perspective, and a location perspective, wherein:

said summary score for said company perspective is based on a subset of said surfaced documents comprising a match with at least one company name associated with said entity profile;

said summary score for said industry perspective is based on a subset of said surfaced documents comprising a match with at least one industry tag associated with said entity profile; and said summary score for said location perspective is based on a subset of said surfaced documents comprising a match with at least one location tag associated with said entity profile.

12. A system as claimed in claim 11 further comprising an administrative subsystem configured to:

display, on a computer-based visual sub-system, an interactive administrative GUI to allow a user to configure at least one entity profile further comprising a supplier and a set of tags associated with said supplier including a supplier tier, a supplier tier weight, a supplier category, and a supplier category weight; and receive and store said entity profile in a computer-readable storage medium.

13. A system configured to perform analytics to facilitate issue awareness comprising:

at least one non-transitory, computer-readable storage medium on which a database management system is stored and configured to access an index of metadata corresponding to a set of content items in a corpora of electronically stored content, wherein said index of metadata comprises a set of geographic tags and wherein each content item in said corpora of electronically stored content is associated with a tag corresponding to said content item's region of publication;

at least one sub-system configured to generate at least one interactive graphical user interface (GUI) for display on a computer-based visual sub-system;

at least one sub-system configured to receive a query request configured by a user in said interactive GUI, wherein:

said query request includes:

a user-defined threshold;

at least two time periods and at least one geographic designation, wherein said at least two time periods comprise a baseline time period and a second time period and said threshold comprises a minimum relevance level; and a subject chosen from a set of subjects contained in said metadata index;

a computer machine configured to:

receive said query request as computer machine input;

search a set of metadata tags stored in said index for at least one term contained in said query request;
identify a set of metadata tags which match said query request;
identify at least one document, in said corpora, which is associated with said set of metadata tags;
calculate a content score for each document identified in the previous step;
when said content score exceeds said user-defined threshold:
   surface said document;
   calculate a summary score for a set of documents surfaced in the previous step based on the content scores associated with said documents, wherein said summary score counts said set of surfaced documents for each of said at least two time periods; and
   display a second interactive user interface to communicate said summary score, wherein said second interactive user interface is configured to:
      graphically compare said summary score associated with each of said at least two time periods,
      graphically display said summary scores for each of said geographic designations, and
      permit a user to click through said summary score to reveal a set of documents from which said summary score was derived.

14. A system as claimed in claim 13 said query request is further configured by providing a set of weights to use as computer machine input to determine if a document meets or exceeds said minimum relevance level wherein said set of weights are associated with said subject's location and frequency in said document.

* * * * *